United States Patent [19]

Wu et al.

[11] Patent Number: 5,150,456
[45] Date of Patent: Sep. 22, 1992

[54] GRAPHIC IMAGE PRINTING SYSTEM AND METHOD

[75] Inventors: Kuo H. Wu, Torrance; Roger Schneider, Redondo Beach; Kelvin K. Ishigo, Gardena, all of Calif.

[73] Assignee: Elite High Technology, Inc., Torrance, Calif.

[21] Appl. No.: 563,417

[22] Filed: Aug. 6, 1990

[51] Int. Cl.$^5$ ............................................. G06D 15/00
[52] U.S. Cl. ..................................... 395/114; 395/110
[58] Field of Search ........................... 364/518-519, 364/235 MS File, 930 MS File, 523, 521; 346/154; 400/70, 76; 358/296, 467, 444; 395/101, 110, 115, 114

[56] References Cited

U.S. PATENT DOCUMENTS

| | | | |
|---|---|---|---|
| 4,660,999 | 4/1987 | Tsuneki | 400/61 |
| 4,939,670 | 7/1990 | Freiman et al. | 364/519 |
| 4,954,968 | 9/1990 | Yamaguchi et al. | 364/519 |

OTHER PUBLICATIONS

LaserJet Series II Printer Technical Reference Manual, Hewlett-Packard, First Edition, May 1987, chapters 1-11.

Primary Examiner—Arthur G. Evans
Attorney, Agent, or Firm—Pretty, Schroeder, Brueggemann & Clark

[57] ABSTRACT

A high speed, low cost real time graphic image printing system includes a host data processing system, a laser printer having a plug connector for receiving a font cartridge storing information defining an image of a printable character, and a cartridge pluggably connected to the font cartridge plug connector. A first communication path carries print commands from the host to the printer while a second communication path carries image defining information between the host and the data store. In operation the host writes information defining a portion of an image to be printed into a portion of the data store corresponding to a selected character and then commands the printing of the selected character. A ping-pong double buffer arrangement allows the host to write a next image portion while information defining a current image portion is read by the printer to form a print image.

10 Claims, 10 Drawing Sheets

GRAPHIC IMAGE PRINTING SYSTEM AND METHOD

CROSS REFERENCE TO RELATED APPLICATION

This application is related to application Ser. No. 07/563,418 simultaneously filed with this application and commonly assigned with this application.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

In recent years laser printers have come into widespread use because of their ability to rapidly and quietly print high quality images at a reasonable price. A typical laser printer prints two dimensional arrays of dots having a resolution of 300 dots per inch both vertically and horizontally. This is sufficient resolution to print letters, legal documents and other documents with what is known as letter quality.

In operation a laser printer is connected to a host computer system through a standard communication path that connects to either a serial port or a parallel port. When operating in a normal typewriter mode or character mode a laser printer is reasonably fast and efficient. A page of letter and number characters can be printed in 8 to 15 seconds. This is fast enough for most business applications.

However, laser printers are capable of printing arbitrarily selected graphic data as well as predefined characters. Because of the high quality of images printed by laser printers, the demand for printing graphic data is increasing rapidly. Persons using a laser printer to print graphic data quickly realize that printing graphic data takes much longer than the printing of character data. For example, it typically takes up to 2.49 minutes to print a full page of bit mapped graphic data when the printer is connected to the host computer through a parallel port and up to 6.94 minutes when the printer is connected through a serial port.

The much longer time required to print graphic images does not result from an inherent limitation in the printer. The printer is capable of printing graphic images as fast as it prints character images. The increased print time for graphic images is caused by a bottleneck in the communication path between the host computer and the printer.

When printing the letter "A", the host sends to the printer a single 8 bit code that represents the letter "A". The letter A is then printed as a rectangular matrix of tiny dots. The dots are printed to turn the paper black along the lines defining the letter and the dot spaces surrounding the strokes of the letter are not printed so the paper is left white.

A typical print character such as the letter "A" is defined by a matrix of dots having 30 dots per row and 50 rows for a total of 1500 dot positions. The printer has an internal computer and a data store that stores one bit of information for each dot position in the dot pattern matrix for each character. Each bit indicates whether the corresponding dot position is to be printed black or left white.

Thus, in response to a received 8 bit command to print the letter "A", the printer's internal computer reads from the data store the 1500 bits which define the print image for the letter "A" and commands the print mechanism to print or not print each corresponding dot position, depending on the state of the data that is read from the store. Since a similar 1500 bits must be stored for each different letter or character that can be printed, the font memory or store that stores this data must be quite large.

Since a single 8 bit command causes the printer to print an image pattern having 1500 dots, relatively little data passes between the host computer and the printer when printing ordinary text or character data. The relative slowness of the communication channel between the printer and the host is of no particular consequence. The printer is internally designed to very rapidly access the font image data that corresponds to character print commands and a page of data can be printed quite rapidly.

However, when the printer is switched to graphics mode, all of the data defining the tiny dot patterns that are printed must be sent through the communication path between the host computer and the printer. This path then becomes a communication bottleneck and greatly slows the rate at which graphic data can be printed.

In an attempt to circumvent this communication bottleneck, one system has been developed which avoids the normal serial or parallel print command communication path. Some printers have a communication access port known as a video port that provides direct electronic access to the printer print mechanism. The developed system provides high speed data communication directly from the host computer to the video port.

While use of the video port to communicate data is believed to increase the speed of graphic printing, this technique has not been widely accepted. In order to use this technique, the customer must use a screwdriver to remove a cover plate from the printer and then install a special printed circuit board into the video port which lies behind the cover plate. A special circuit and special software must also be installed at the host. This method has met with much customer resistance. Furthermore, the video port was designed primarily as a manufacturing test facility and not for the purpose of convenient user access. Such a port has not even been provided on some recently introduced models of laser printers. A significant need still remains for a satisfactory means of rapidly communicating graphic data between a host computer and dot pattern image printer.

SUMMARY OF THE INVENTION

A high speed, low cost graphic printing system and method in accordance with the invention includes a host data processing system, a high resolution dot pattern printer and two communication paths connecting the host to the printer. The printer is preferably a laser printer and includes a writable font store storing information defining print character images. The first data path is a conventional serial or parallel port connection, while the second communication path is a high speed path for writing information defining image dot patterns directly into the font memory. The high speed path is provided through a real time font cartridge that pluggably replaces and simulates a conventional plug in font cartridge. The system may further include an expander module that optionally allows a real time font cartridge, a conventional font cartridge or both to be simultaneously plugged into a laser printer. The expander is transparent to the conventional cartridge and to the peal time font cartridge as seen by the printer. This is true even if In operation, the host data processing system, which may be a conventional 80386SX based AT compatible personal computer system, first initializes itself by loading to memory an interrupt service routine. To reduce memory cost a graphic page is divided into several horizontal print bands or sections with one band at a time being written to the font store. Each print band is defined by a plurality of print characters which have within the band. When these characters are printed in the proper sequence a portion of the image corresponding to the band has been printed. When the printer has read a section from the real time font store, a control circuit for the real time font cartridge generates an interrupt signal that is communicated to the computer. The interrupt service routine responds by writing character information defining a next horizontal band of the graphic image to the font store until all bands have been written. Because this graphic data is communicated to the printer over the high speed second communication path, it can be transferred very quickly without being bound by the inherent slowness of the standard serial or parallel data port path.

After the interrupt service routine is loaded during program initialization, the graphic image program initializes font data, initializes the real time font cartridge and initiates a print cycle. The font tables which appear at the beginning of the font store address space are created and the font store control circuit is initialized. Next, the first two sections of image data are written to the font store and the third section is preloaded into a host memory buffer so that it will be immediately available to the interrupt service routine upon the occurrence of an interrupt signaling that that the last byte has been read from the real time font cartridge ping-pong buffer. It will be appreciated that as memory prices decrease, economics will allow larger and larger font stores until a complete page of image data can be sent as a single section.

Once the image data for the initial image data sections have been loaded, the program assembles and communicates over the first, low speed, communication path the PCL control job commands required to print a page of data. The communication of graphic image data is fast enough that the font store can be loaded with current image data on a real time basis as printing proceeds. Delay commands may be built into the PCL printer commands to assure that the host can supply image data at least as fast as the printer can use it.

BRIEF DESCRIPTION OF THE DRAWINGS

A better understanding of the invention may be had from a consideration of the following Detailed Description, taken in conjunction with the accompanying drawings in which.

DETAILED DESCRIPTION OF THE INVENTION

Figure 1:
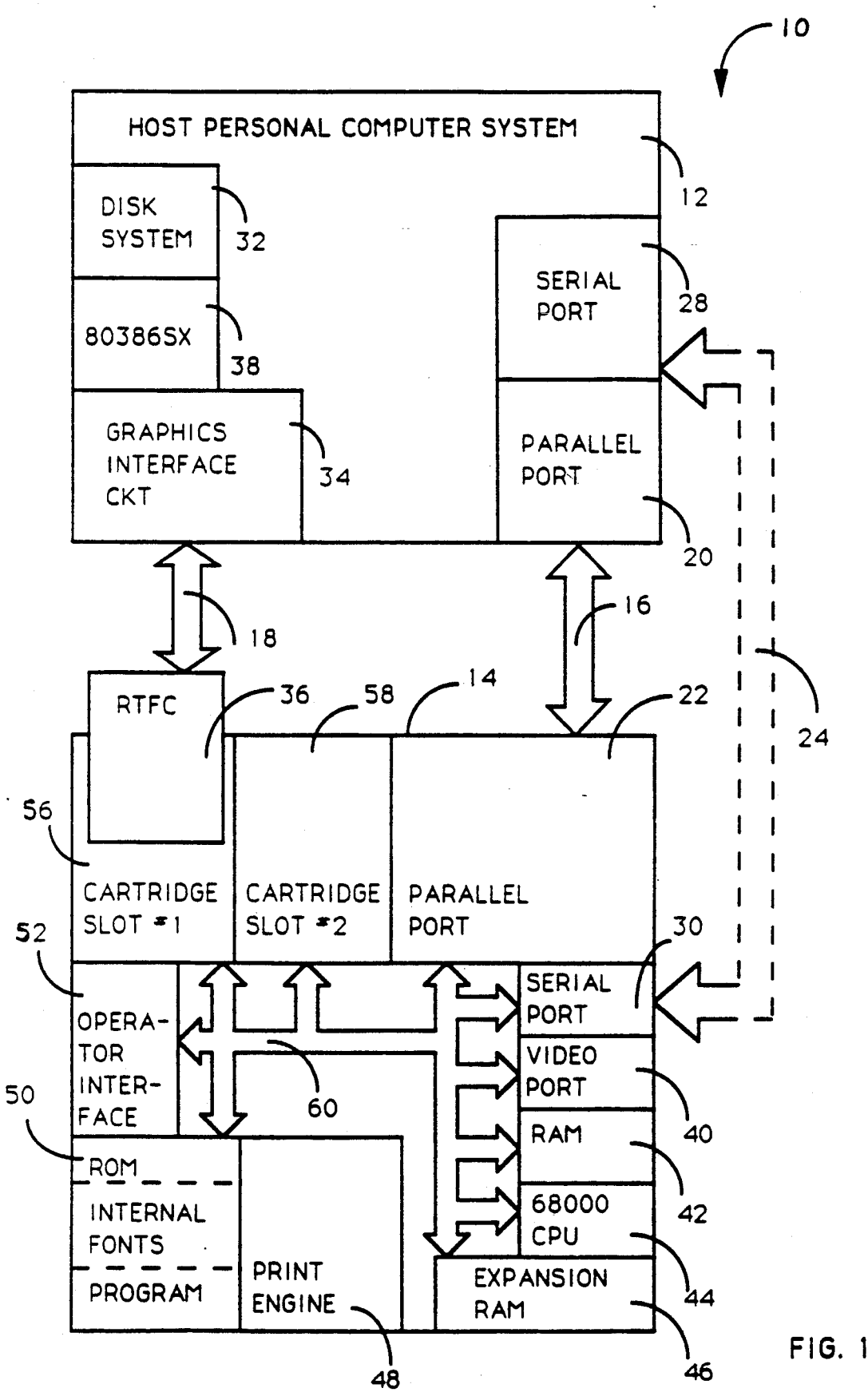
FIG. 1 is a is a block diagram representation of a high speed printing system in accordance with the invention.

Referring now to FIG. 1, a high speed graphic printing system 10 in accordance with the invention includes a host data processing system 12 coupled to control a dot pattern printing system 14. Host 12 is coupled to printer 14 via two independent communication paths 16, 18. The first communication path 16 is a conventional parallel printer communication path between two standard Centronix parallel printer ports 20, 22 at the host 12 and printer 14, respectively. Communication path 16 carries conventional printer communication language or PCL printer commands from the host data processing system 12 to the printer system 14. As an alternative to the parallel communication path 16, most printers are configured to allow coupling of the host 12 to the printer 14 via a conventional serial communication path 24 between standard 232C serial ports 28, 30 in host 12 and printer 14, respectively.

It will be noted that either the parallel path 16 or the serial path 24 would be selected for a given application and that both paths 16, 24 would normally not be connected. In the present example, the somewhat faster parallel path 16 has been selected for the principle embodiment with serial path 24 being shown in dotted outline to indicate a nonselected, but alternate path. The high speed dot pattern communication path 18 has a data rate of 4 megabytes per second which is much higher than either the parallel path 16 or serial path 24 and is used to communicate voluminous dot pattern data from host processor 12 to printer 14 at high speed.

For printing of graphic images, host processor 12 first uses high speed path 18 to communicate dot pattern graphic data stored by a mass storage system such as a disk system 32 through a graphics interface board 34 in host processor 12 to a real time font cartridge 36 at the printer 14. Once the dot pattern image data has been communicated, a relatively low volume of conventional printer command language PCL data is communicated over parallel path 16 between parallel port 20 and parallel port 22 of printer 14 to command the printing of an image defined by the data that was previously communicated over high speed path 18 and stored by real time font cartridge 36. This procedure allows the voluminous image data to be communicated at high speed over path 18 to avoid a bottleneck presented by conventional parallel path 16. Once the voluminous image data has been communicated to printer 14, a relatively low volume of conventional PCL commands can be communicated over parallel path 16 in a relatively short time to command the printing of the dot pattern image data that is communicated at high speed over path 18.

Host data processing system 12 may be a conventional personal computer system and in the preferred example it is a widely available AT type of personal computer system having an 80386SX micro processor 38 manufactured by Intel Corporation.

In operation the host processing system 12 commands the printing of a graphic image by sending at least a portion of the dot pattern image data over the high speed communication path 18. While this data can be quite voluminous, the path 18 is sufficiently fast that the graphic image data can be transmitted within a relatively short time. The host processor 12 then sends over the slower parallel communication path 16 printer command language (PCL) commands that actually control the printing of the graphic image data. While these commands are sent at a much slower rate, the volume of data is relatively low and takes a short period of time compared to the minimum 10–12 seconds that are required to print a page of data. In the event that all graphic data was not initially sent to the real time font cartridge 36 over high speed communication path 18, additional graphic image data is sent over the path 18 as data is read by printer 14 from real time font cartridge 36 to make room for additional data. The dot pattern data must be sent in real time in the sense that it must be sent sufficiently fast that printer 14 never runs out of data as it is printing a page of graphic image data.

In general the printing system 14 can be any suitable dot pattern printing system having a writable font memory storing information defining a graphic image that is to be printed. In the preferred example, the printer 14 is a laser printer such as one of a series of laser printer models manufactured by Hewlett Packard or a printer that is fully compatible therewith. In the present example it will be assumed that printer system 14 is a Hewlett-Packard LaserJet Series II laser printer. Particular attention is directed to the Hewlett Packard LaserJet Series II Printer Technical Reference Manual, first edition dated May 1987 for information relating to the use and operation of this printer.

While the LaserJet Series II printer is fully capable of printing graphic image data using only information communicated through the conventional parallel communication path 16 or serial communication path 24, the printing proceeds very slowly. Experimental studies have suggested that it takes up to approximately 2.49 minutes to print a full 8 ½ × 11 inch page using the parallel port 16 and up to 6.94 minutes if the data is communicated over the somewhat slower serial port 24. In contrast, when the dot image data is communicated over the high speed communication path 18, the maximum printer printing rate of approximately 8 letter sized pages per minute can be maintained.

In addition to the parallel port 22 and serial port 30, the printer 14 includes a video port 40, random access memory 42, a 68000 series micro processor manufactured by Motorola Corporation that serves as a central processing unit 44 and expansion RAM 46. The printer 14 also includes a print engine 48 which actually prints the dot image patterns on the print media such as paper, a read only memory 50 and an operator interface 52 which includes a relatively simple keyboard and display. The ROM 50 stores internal, self-contained font data defining the dot patterns for several self-contained character fonts as well as program data for operating the CPU 44. All of these system components as well as two cartridge slots 56, 58 are interconnected by a standard 68000 series micro processor data bus 60 which carries 16 parallel data lines and 21 parallel address lines.

The quantity of dot pattern image data that is required to define a font of characters is so great that image data defining only a few selected fonts is stored in the ROM 50 on a permanent basis. However, commercially available software packages are available to generate additional fonts through the host 12 and communicate the information defining these additional fonts over the parallel communication path 16 for storage in RAM 42 or expansion RAM 46. Data defining these additional fonts is lost each time the printer 14 is turned off and if desired, must be reloaded each time the printer 14 is turned back on. These additional fonts are generated by commercially available software packages and are commonly known as soft fonts. They must be stored within the random access memory of the printer 14 and thus occupy a substantial portion of the memory. Typically at least some expansion RAM 46 must be installed to accommodate these soft fonts.

In addition to the soft fonts, cartridges storing desired additional fonts in read only memory can be purchased and pluggably connected to the printer 14 through either cartridge slot 56 or cartridge slot 58. These cartridge fonts have the advantage of not occupying space in the RAM 42 or expansion RAM 46, but are limited to a certain number of predefined, nonalterable fonts.

It should be appreciated that a font is a compilation of dot pattern data that defines the image shape for a set of characters that make up the font. Typically a character set will contain all of the upper and lower case letters A-Z, the numbers 0-9 and certain other characters or symbols such as the additional characters that are normally found on a typewriter keyboard. A particular font defines the visual characteristics of the symbols in the character set such as the character sizes, the line height, the style or any other feature. Every variation in the image pattern for a character set requires a different font. For example, if the letter A is to be printable in italics, boldface, normal type and in a script format, a different font would have to be stored for each of these variations. Different fonts are also stored for each different size of character. The cartridge fonts and the soft fonts thus afford the printer user a virtually unlimited range of styles and sizes for printable characters.

During normal operation, the printer 14 receives over parallel path 16 from host 12 PCL commands defining information that is to be printed.

For example, a typical PCL print command might command the printer to move to a certain dot location on the print media, and print the letter A from a certain specified font. The font will define the dot pattern for the A including the size and the visual characteristics of the character. Upon receipt of the command, the central processing unit 44 will access one of the printer font store locations until it finds the designated font, will read therefrom the dot pattern for the designated character and store the dot pattern within a page or band buffer that is formed within the RAM 42 or expansion RAM 46. As commands to print additional characters are received from the host 12, these additional characters are accessed from the designated font definition memories and added to the page buffer within RAM 42 or expansion RAM 46. As the dot pattern information defining the print characters is assembled into the page buffer, paper or other print media is moved through the print engine 48 and the indicated dot pattern is printed thereon. Once all of the dot patterns for a given page have been printed, the page is ejected and printing for a next page can begin. The dot image data is accessed at high speed and communicated in high volume over the internal printer bus 60 from the storage location for the designated font to the print engine 48. The printer is thus able to maintain a relatively high print rate of approximately 8 pages per minute for character type data. However, when the dot patterns are not internally stored as a font within one of the font stores for printer 14, the dot pattern information must be communicated over the relatively slow parallel communication path 16 and several minutes can be required to print a single page of data. In particular, the dot pattern information must be received by parallel port 22, communicated over internal bus 60 to a page buffer that is formed within RAM 42 or expansion RAM 46 and upon receipt of a full page of dot pattern data, the dot patterns are then communicated over bus 60 from the page buffer to print engine 48.

In the printing system 10 in accordance with the invention, the conventional font cartridge is replaced by the real time font cartridge 36 which is matably plugged into the cartridge slot 56 or cartridge slot 58 as if it were a conventional font cartridge. However, the real time font cartridge 36, instead of storing a predetermined, fixed font within an internal ROM data store, contains a writable font data store which receives selected dot pattern definition information over the high speed communication path 18. It will be appreciated that the writable font store could be permanently connected to the printer 14 and internal data bus 60. However, in the present example, it is preferred that the real time font cartridge be pluggably connected to the printer 14 through the cartridge slot 56 as if it were a conventional font cartridge.

Figure 2:
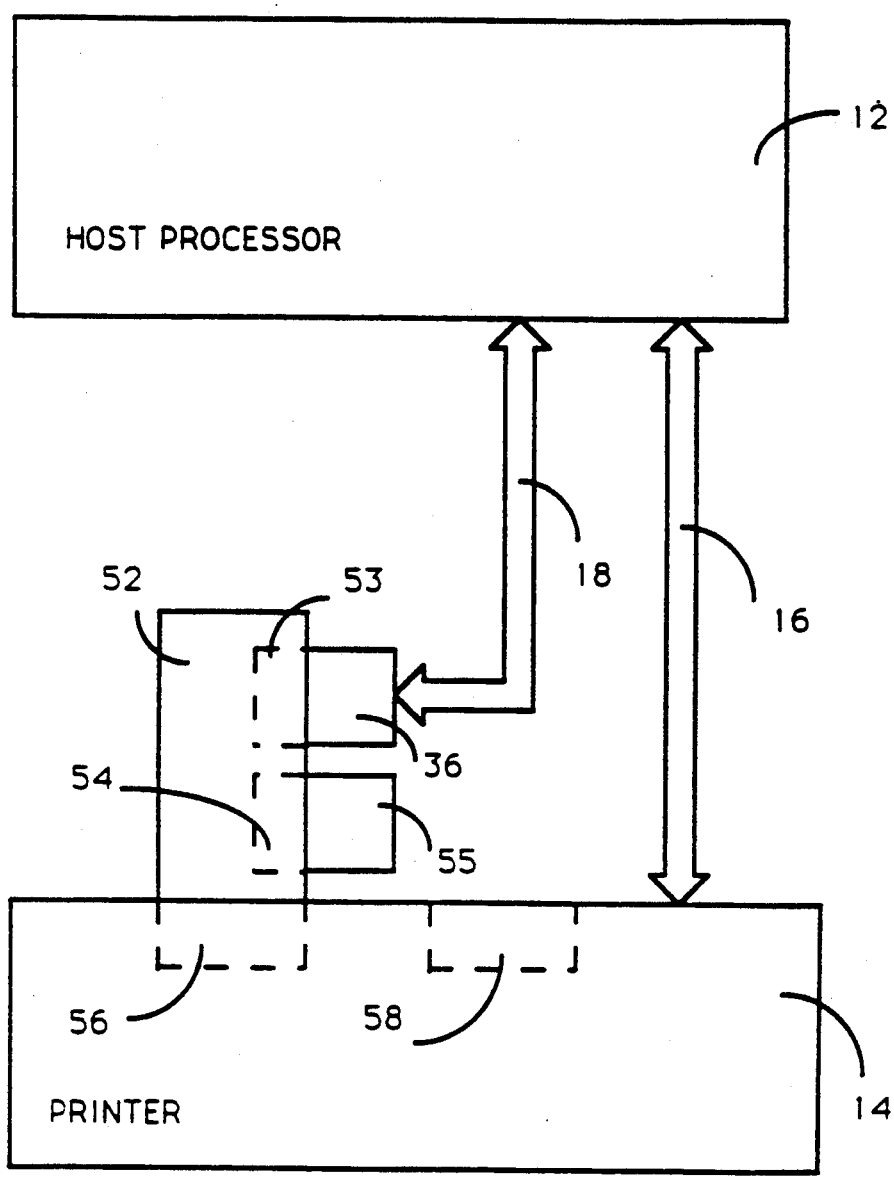
FIG. 2 is a block diagram representation of an alternative embodiment of a high speed printing system having an expander that permits plug connection of both a standard font cartridge and a real time writable font cartridge.

As shown in FIG. 2, the real time font cartridge 36 may optionally be plugged into an expander cartridge 52 having a plug connection slot 53 for receiving real time font cartridge 36 and a plug connection slot 54 for receiving a standard font cartridge 55. Expander cartridge 52 plugs into one of the conventional font cartridge slots 56, 58 of printer 14. Expander cartridge 52 essentially acts as a multiplexer to connect either cartridge slot 53 or slot 54 to the printer slot 56. Normally conventional cartridge slot 54 is coupled to slot 56 of printer 14, but when a real time font cartridge is inserted into slot 53, host 12 may communicate a command through a real time font cartridge 36 that commands expander cartridge 52 to couple real time font cartridge 36 to printer 14.

Figure 3:
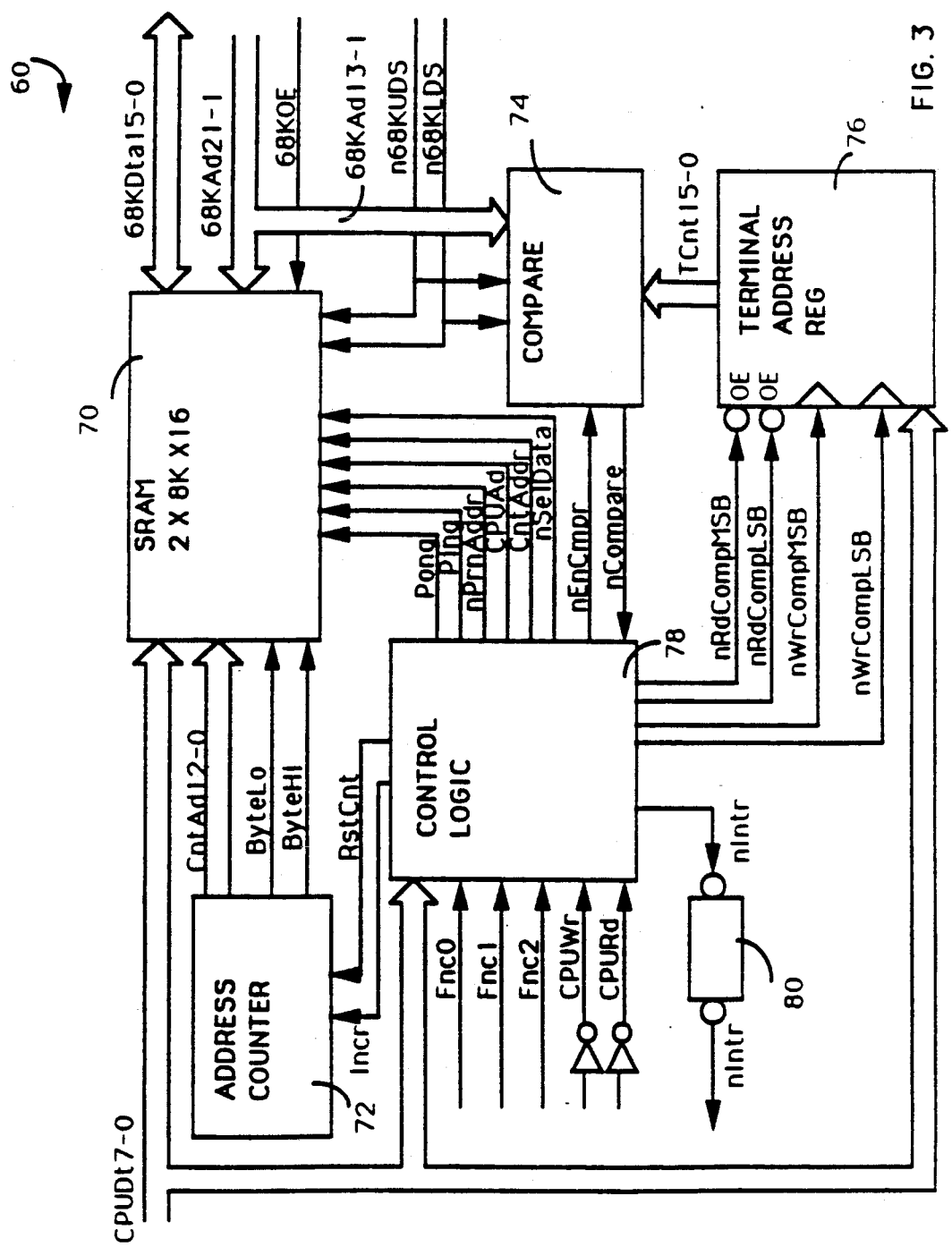
FIG. 3 is a block diagram representation of a printer font store circuit, used in the printing system shown in FIG. 1.

Referring now to FIG. 3, the real time font cartridge 36 includes a two port, double buffered 8 K × 16 SRAM 70, a 14 bit address counter 72, an address comparator circuit 74, a terminal address register 76, :r control logic 78 and a ferrite filter 80 that filters a pulsed interrupt request signal, nIntr, that is generated by the compare circuit 74.

The interface to the host data processor 12 through high speed communication path 18 is shown on the left and includes 8 bidirectional data lines designated CPUDt7-0, 5 control signals designated Fnc0, Fnc1, Fnc2, CPUWr, and CPURd as well as the return interrupt request signal nIntr which passes from compare circuit 74 through the high speed data path 18 to the host data processor 12. The graphics interface board 34 of host 12 latches interrupt signal nIntr and in turn generates an interrupt request on a suitable request line such as line number 3 that is communicated to processor 38.

The interface through a plug connector to the printer 68000 bus 60 is shown on the right of FIG. 2. These signals include 16 bidirectional data bits designated 68kDta15-0 which are used for read only with respect to the font cartridge, 21 address lines designated 68kAd21-1, an output enable signal designated 68kOE which is utilized to strobe the address and data lines, a signal n68kUDS which selects an upper data segment or byte and a signal n68kLDS which selects a lower data segment or byte.

One buffer of the double buffered SRAM 70 can be read or written through a first, host port, while the other buffer section of SRAM 70 is simultaneously and asynchronously being read by the printer 14 through the second, printer port. Control logic 78 responds to the 5 control signals received from host processor 12 as well as a compare signal generated by compare circuit 74 to control the operating state of real time font cartridge 36. Control logic 78 controls which buffer of SRAM 70 is coupled to the host data processor port for writing or reading thereby. Either buffer may be coupled to the host port and the other buffer is automatically coupled to the printer port.

Address counter 72 is provided to minimize the number of signal lines passing between real time font cartridge 36 and graphics interface board 24 on the host data processor 12. The local address generation by counter 72 increases the speed of data transfer by enabling a DMA type transfer and eliminating time division multiplexing of address and data information. The use of address lines through the high speed data path 18 is eliminated by using address counter 72 to address the connected buffer within SRAM 70. A read or write communication between the host data processor 12 and the selected buffer of SRAM 70 is initiated by resetting address counter 72 to zero. The host data processor 12 through the graphics interface board 24 then begins reading or writing sequential bytes within the selected buffer of SRAM 70. With each read or write access as indicated by the signals nCPUWr and nCPURd, address counter 72 is incremented by control logic 78 to enable each byte location within the selected buffer of SRAM 70 to be read or written in sequence.

The elimination of address lines in communication path 18 and substitution of address counter 72 results in some loss of communication efficiency in that all byte locations within the selected buffer of SRAM 70 must be written in sequence whether or not the new data is identical to the previously stored data. However, the data communication over high speed data path 18 is sufficiently fast compared to the speed at which the printer 14 operates that this duplication of previously serious consequence. This is particularly true since any duplicated data represents a small portion of the total data that is to be written. In order to further reduce the number of physical wires extending between the real time font cartridge 36 and graphics interface board 24 over data path 18 only 8 data lines are provided while each buffer of SRAM 70 is a 16 bit buffer. The least significant bit of address counter 72 therefore provides complimentary output signals ByteLo and ByteHi which select alternately a low or high byte within each 16 bit data word stored by SRAM 70. Throughout this disclosure a lowercase "n" used in conjunction with a signal designation will indicate an inverted or active low state for the signal at the designated point. For example, a signal nPing would be the compliment of a signal Ping.

A terminal address register 76 stores the final address within a buffer of SRAM 70 that is coupled to printer 14 that contains valid font or image data. As the printer begins reading data over bus 60 from the previously written image buffer, the comparator circuit 74 compares the address of the data being accessed with the terminal address stored in terminal address register 76. A true comparison indicates that the last address of a block of image data has been read and in response an interrupt signal is provided to the host data processing system as a signal that the printer 14 has completed accessing of a previously written block of image data. The host can then respond by writing a new block of image data or taking such other action as may be appropriate under the circumstances. At the same time, the compare circuit provides to control logic 78 a signal COMPARE indicating that the last address has been accessed. Control logic 78 uses this signal to automatically switch buffers so that the opposite buffer can be connected to the printer port and the printer can immediately continue reading dot image data from the alternate buffer without interruption. The alternative buffer should have been loaded by host data processing system 12 over high speed data path 18 while the prior buffer was being read by the printer 14. While the alternate buffer is now being read by the printer 14, the first buffer can be reloaded through the host data port with a next section of graphic image data. In this way the writing of a next section of graphic image data by the host data processor and the reading of a previously written section of graphic image data by the printer can continue in real time until a complete page of graphic image data has been written by the host and printed by the printer 14.

Figure 4:
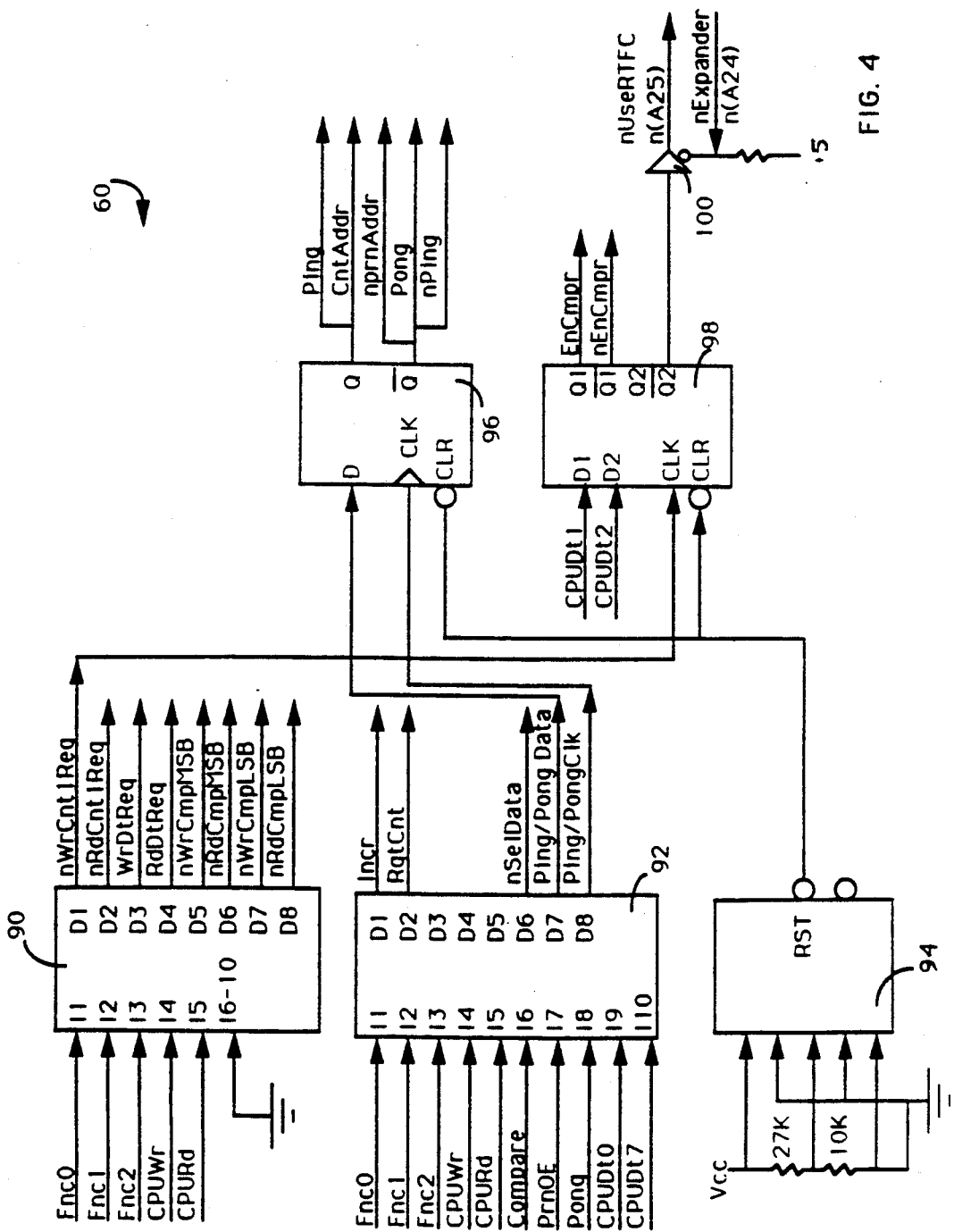
FIG. 4 is a block diagram representation of control logic used in the printer font store circuit shown in FIG. 2.

Making further reference now to FIG. 4, the control logic 78 includes a 16V8 programmable generic array logic circuit (GAL) 90 which decodes the 5 control signals received over high speed communication path 18 to control the writing and reading of selected registers within the real time font cartridge 36. Signal nCPUWr commands a write operation for writing of data from host data processor 12 to the real time font cartridge 36 while signal nCPURd commands the reading of data information from a location within real time font cartridge 36 to the host data processor 12. The three function signals Fnc2, Fnc1 and Fnc0 operate as binary coded address signals to select 1 of 4 read write functions within the real time font cartridge 36. Signals controlling alternately the writing and reading of these 4 functions are output by GAL 90 which serves as an address decoder. The first two outputs designated D1 and D2 of GAL 90 control the writing and reading of a control register in response to Fnc2, Fnc1, Fnc0=00X and are designated nWrCntlReg and nRdCntlReg. "X" represents a do not care state.

As actually implemented, the control register is a write only register with only 4 of the possible 8 data bits having any meaning. The D3 and D4 signal outputs decode Fnc2-0=01X to select the reading and writing of the 8K buffer which is currently coupled to the CPU port. The D5 and D6 outputs decode Fnc2-0=10X to generate signals nWrCmpMSB and nRdCmpMSB for writing or reading the most significant byte of terminal address register 76. Similarly, signals Fnc2-0=11X are decoded to enable writing and reading of the least significant byte of terminal address register 76 by generating signals nWrCmpLSB and nRdCmpLSB.

Control circuit 78 further includes a second GAL circuit 92, a power on reset command generator 94, a flip-flop 96 and a two bit register 98. The flip-flop 96 controls which of the two image buffers of SRAM 70 is coupled to the host data port. The other is automatically coupled to the printer data port. If the Q output of flip-flop 96 is high, the host port is connected to buffer 1 (Ping) while the printer port is connected to buffer 0 (Pong). If the Q output of flip-flop 96 is low, then the host port is connected to buffer 0 (Pong) while the printer port is coupled to buffer 1 (Ping). Signals Ping and nPing and Pong control the coupling of the proper host or printer data path to the appropriate image buffer while signals CntAddr and nPing similarly control the coupling of the proper address signals from counter 72 or from the printer data bus 60 to the appropriate buffer within SRAM 70. Flip-flop 96 appears as bit 0 in the writable control register and the host data processor 12 can set flip-flop 96 to a state designated by signal CPUDt0 by activating strobe signal nCPUWr while binary coded register function signals Fnc2-0 are set to 00X to select the control register. Under this circumstance GAL 92 outputs the 0 data bit received at input 19 on output D7 as a signal Ping/PongData which is communicated to the D input of flip-flop 96. At the same time, GAL 92 generates a clock signal designated Ping/PongClk at the D8 output thereof which is communicated to the clock input of flip-flop 96 to load the state of signal Ping/PongData therein. Similarly, the D1 input of register 98 is coupled to receive data path 18 data signal CPUDt1 while the D2 data input is coupled to receive data path 18 data signal CPUDt2. The clock input to register 98 is activated by signal nWrCntlReg upon decoding of a write access to the control register by GAL 92. GAL 92 decodes a write access to the control register by passing data signal CPUDt7 which is the most significant bit position of the data lines appearing on high speed communication path 18 through to output D2 as signal RstCnt which when set to 1 clears the address counter 72 to 0. The host data processor 12 thus has programmable control over the real time font cartridge 36 through the pseudo control register to selectively control the resetting of address counter 72 (Bit 7), to control the state of flip-flop 96 (Bit 0) which in turn determines which image buffer within SRAM 70 is coupled to which access port, and to control the state of registers 96 and 98. The first bit of register 98 (Bit 1) selectively enables or disables the compare circuit 74. When the inverted Q1 output of register 98 goes active low, an output signal nEnCmpr goes active low to enable comparator 74 so that active output signals nIntr and COMPARE will be generated anytime the printer accesses an address indicated by terminal address same state as comparable bit positions in terminal address register 76. In the present implementation signal n68kLDS is compared at most significant compare position 15 signal n68kUDS is compared at the next most significant compare position 14 and signal nPrnOE is compared at position 13 to indicate that the printer CPU bus is accessing a location within the address space of the font cartridge. Printer address signals 68kAD13-68kAD1 are coupled sequentially to the 12 least significant compare bit positions of comparator 74.

Bit 2 of register 98 selectively commands expander cartridge 52 to couple real time font cartridge 36 to printer 14. The nQ2 output of register 98 couples to the input of a tristate driver 100 which has its output driving signal nUseRTFC or n(A25) and has an enable input coupled to signal nExpander or n(A24) and also through a pullup resistor to Vcc.

Signal nExpander or n(A24) and nUseRTFC or n(A25) connect two printer interface connector pins that normally carry Vcc power and are normally a +5 volts. Signal nExpander thus disables driver 100 and signal nUseRTFC remains at a high impedance state. Since main power to real time font cartridge 36 is supplied by host 12 over the high speed cable 18, use of these printer interface power connections causes no problem.

In the event that real time font cartridge 36 is plugged into the expander cartridge 52, expander cartridge 52 presents ground rather than Vcc on signal nExpander to enable driver 100. The host can then control the state of signal nUseRTFC by selectively controlling bit CPUDt2 while writing to the control register of real time font cartridge 36. When inactive high signal nUseRTFC commands coupling of the conventional font cartridge 55 to printer 14. When active low, signal nUseRTFC commands the coupling of real time font cartridge 36 to printer 14. A power on reset resets register 98 to a default cleared state in which the nQ2 output is inactive high so that the conventional cartridge 52 is connected to printer 14 at power on.

The D6 output of GAL 92 decodes Fnc2-0=01X to generate signal nSelData which couples the current buffer port to the CPU data bus whether a read or a write data transfer is taking place. The signal enables a bank select decoder 132 (FIG. 4).

When the function selection signals Fnc2-0 are set to 10X while CPUWr is asserted the writing of a most significant byte of terminal address register 76 is clocked by generation of signal nWrCmpMSB by logic 90. When this signal makes a low to high transition at the end of a write cycle it clocks the most significant byte of terminal address register 76 to load the high speed data path data signals CPUDta7-0 into the most significant byte. As a convenience, read signal nRdCmpMsb from the D6 output of GAL 90, which is normally inactive high is coupled to an active low output enable input to the most significant byte of terminal address register 76. The outputs of terminal address register 76 are constantly coupled to comparator 74. When driven active low the output enable input cause the normal data input terminals to be driven as a second set of outputs so that data is placed on data lines CPUDt7-0 for reading by host 12. Similarly, the D7 output of GAL 90 bearing signal nWrCmpLsb=n(Fnc2*Fnc1*CPUWr) is coupled to the clock input of least significant byte of terminal address register 76 to enable the writing of data signals CPUDt7-0 therein when the low to high transition occurs in signal nWrCmpLsb at the end of a write cycle access to this register. The D8 output of GAL 90 generates a normally low signal nRdCmpLsb=n(Fnc2*Fnc1*CPURd) which is connected to an active low output enable signal for the least significant byte of terminal address register 76 to maintain the output thereof normally coupled to the compare circuit 74.

In response to detection of a power on condition, power on reset circuit 94 generates an output signal which clears flip-flop 96 to the 0 state to connect bank 0 (Pong) to the host data port of SRAM 70 and clears register 98 to the 0 state to enable the operation of compare circuit 74. Clearing register 98 also forces the expander cartridge command signal nUseRTFC, if enabled, to a high state so that coupling of a conventional cartridge 55 to printer 14 is commanded in response to a power on reset.

GAL 92 generates several output signals having the following logic functions:

$$\text{Incr} = n\text{Fnc2}^*\text{Fnc1}^*n\text{Fnc0}^*\text{CPUWr} + n\text{Fnc2}^*\text{Fnc1}^*\text{Fnc0}^*\text{CPURd} \quad (1)$$

$$\text{RSTCnt} = n\text{Fnc2}^*n\text{Fnc1}^*n\text{Fnc0}^*\text{CPUDt7}^*\text{CPUWr} \quad (2)$$

$$n\text{SelData} = n(n\text{Fnc2}^*\text{Fnc1}) \quad (3)$$

$$\text{Ping/PongData} = n\text{Fnc2}^*n\text{Fnc1}^*n\text{Fnc0}^*\text{CPUWr}^* \cdot \text{CPUDt0} + n(n\text{Fnc2}^*n\text{Fnc1}^*n\text{FncO})^*n\text{Pong} \quad (4)$$

$$\text{Ping/PongClk} = n\text{Fnc2}^*n\text{Fnc1}^*n\text{Fnc0}^*\text{CPUWr} + \text{Compare} \quad (5)$$

Figure 5:
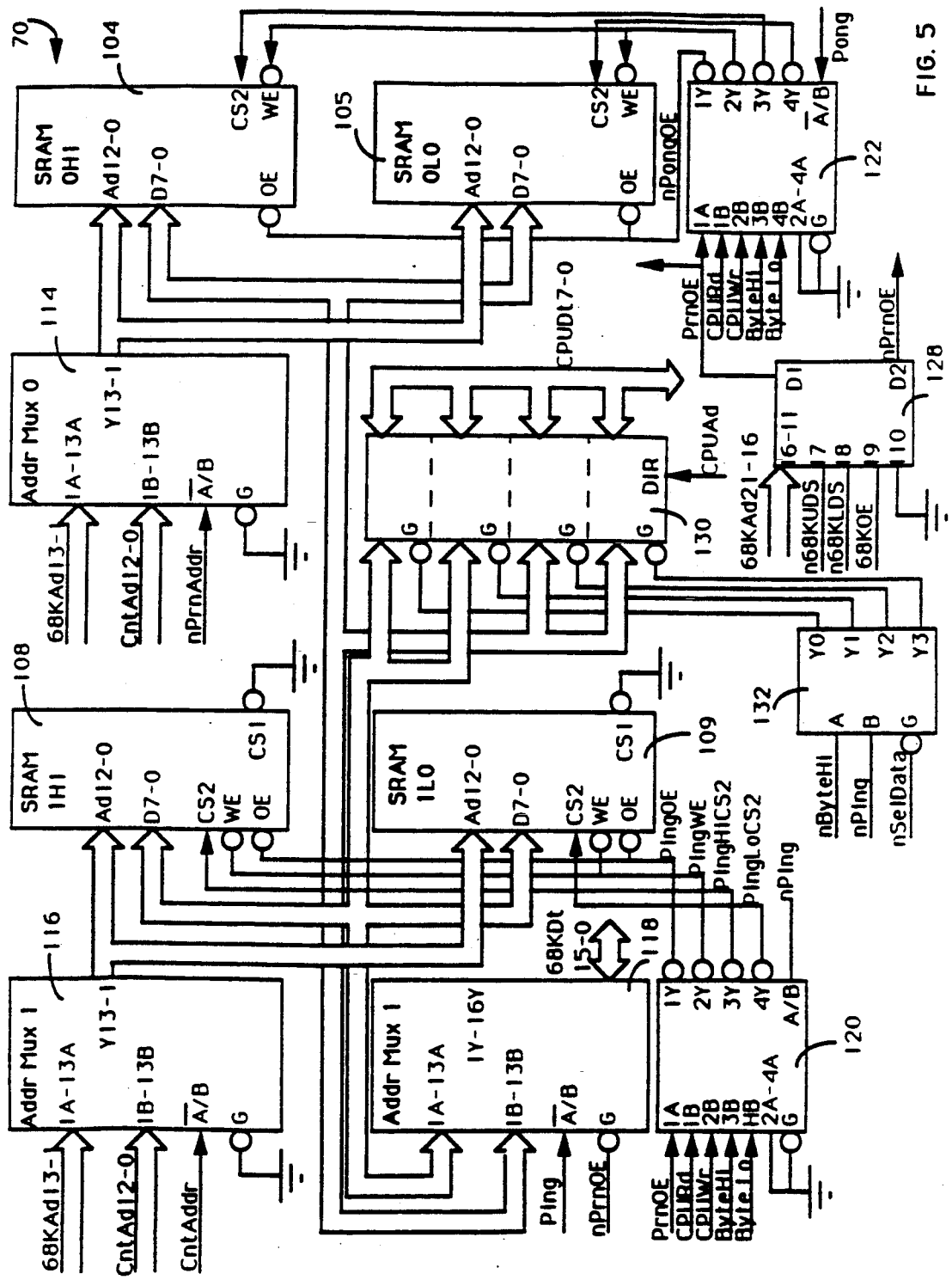
FIG. 5 is a block diagram representation of a two port double buffered static random access memory used in the printer font store circuit shown in FIG. 2.

The construction of the double buffered two port 16K×16 SRAM 70 is illustrated in greater detail in FIG. 5 to which reference is now made. SRAM 70 is implemented on four 8K×8 SRAM memory chips 104, 105, 108 and 109. Image buffer 0 comprises chips 104, 105 while image buffer 1 from bank 1 comprises chips 108, 109. The address inputs to bank 0 are generated by an address multiplexer 0 114 which receives as A inputs printer address signal 68k13-1 and as B inputs signal CntAd12-0 from address counter 72. Signal nPrnAddr drives the selection input of address MUX0 114 to select the B inputs carrying the counter address signals when bank 0 is connected to the host port and to select the A inputs carrying the printer address signals when bank 0 is connected to the printer port. Similarly, an address multiplexer 1 116 is connected to drive the address inputs of bank 1 having memory chips 108, 109 in identical fashion to address MUX 114 for bank 0 except that the selection input to address MUX 116 is driven by signal CntAddr which is the compliment of signal nPrnAddr. These two selection signals are generated by the bank selection flip-flop 96 as shown in FIG. 4.

A 16 bit multiplexer 118 (FIG. 5) provides communication of data signals from one of the banks to the 16 data signals 68kDt15-0 on printer internal bus 60. These 16 data lines are connected to the Y output terminals of multiplexer 118 while the A input terminals are connected to the 16 bit data signals from memory bank 1 having memory chips 108, 109. Similarly, chips 104, 105 from memory bank 0 are connected to the 16 B inputs of multiplexer 118. Signal nPrnOE from GAL 128 goes active low to gate multiplexer 118 only when the printer high bit address signals have been decoded to indicate that the printer is reading an address within the address space of the font store SRAM 70. This occurs when all address signals are high, the segment select signals are active low and output enable is active high. Signal Bnk1 from the bank selection flip-flop 96 is connected to the input selection terminal of multiplexer 118 to determine whether the printer data lines are connected to bank 0 or bank 1 when the gate input is enabled.

Similarly, a 4 bit multiplexer 120 generates 4 output signals for controlling the selection enabling of the bank 1 memory chips 108, 109. Multiplexer 120 is continuously gated active and has its input selection signal driven by signal nPing that is generated by the bank selection flip-flop 96. Input 1A is driven by the printer address decode signal PrnOE while input 1B is driven by the signal CPURd which indicates a read access through the host processor memory port. Output 1Y generates an active low signal nPingOE which is coupled to drive the active low output enable inputs for both bank 1 chips 108, 109. Input 2A is coupled to ground while input 2B is coupled to host write command CPUWr. Output 2Y generates an active low write enable signal nPingWE which is connected to the active low write enable inputs of bank 1 memory chips 108, 109. Input 3A is connected to ground while input 3B is driven by signal ByteHi from the host address counter 72 to indicate that the high byte of the two memory bytes connected to the host memory port is being activated. Output 3Y generates an active low chip select signal nPingHiCS2 which is connected to the chip select input CS2 of most significant SRAM byte 108. Input 4A of multiplexer 120 is connected to ground while input 4B is connected to the low byte selection output of host processor address counter 72 ByteLo. Output 4Y carries signal PingLoCS2 and is connected to the chip select 2 input of lower byte bank 1 SRAM chip 109. A chip control multiplexer 122 is connected essentially identically to chip control multiplexer 120 except that multiplexer 122 drives the control inputs of bank 0. The input selection signal for multiplexer 122 is driven by signal Pong, which is the compliment of the selection signal Ping which drives the selection input to multiplexer 120 for bank 1.

A set of four 8 bit wide transceivers 130 control the selective coupling of the host 8 bit data lines CPUDt7-0 to the four bank 0 and bank 1 memory chips 104, 105 and 108, 109. A 4 bit binary decoder selectively enables one of the transceivers 130 to couple the host data lines to 1 of the 4 memory chips when signal nSelData from the wire D6 output of GAL 92 indicates that the host is accessing its associated memory port. Binary coded input signals ByteHi and nPing are decoded to indicate whether bank 0 chips 104, 105 or bank 1 chips 108, 109 should be connected to the 8 data lines of high speed communication path 18 while signal nBnkHi indicates whether the high byte or the low byte should be connected to the 8 data lines. The two memory banks, bank 0 and bank 1 are thus each operatively connected to any selected one of the host and printer memory access ports while the other data bank is automatically connected to the other access port. This enables the SRAM 70 to be operated in a double buffered or ping-pong mode in which the host 12 writes a next block of image data to the SRAM 70 while the printer 14 reads a previously written block of image data from the SRAM 70. Continuous high volume dot pattern image data may thus be communicated in real time from host data processor 12 to one of the SRAM 70 data banks while printer 14 is reading print image data from the SRAM 70 to form a graphic image for printing onto a print media. The operation of printer paces the real time data transfer requirement.

Figure 6:
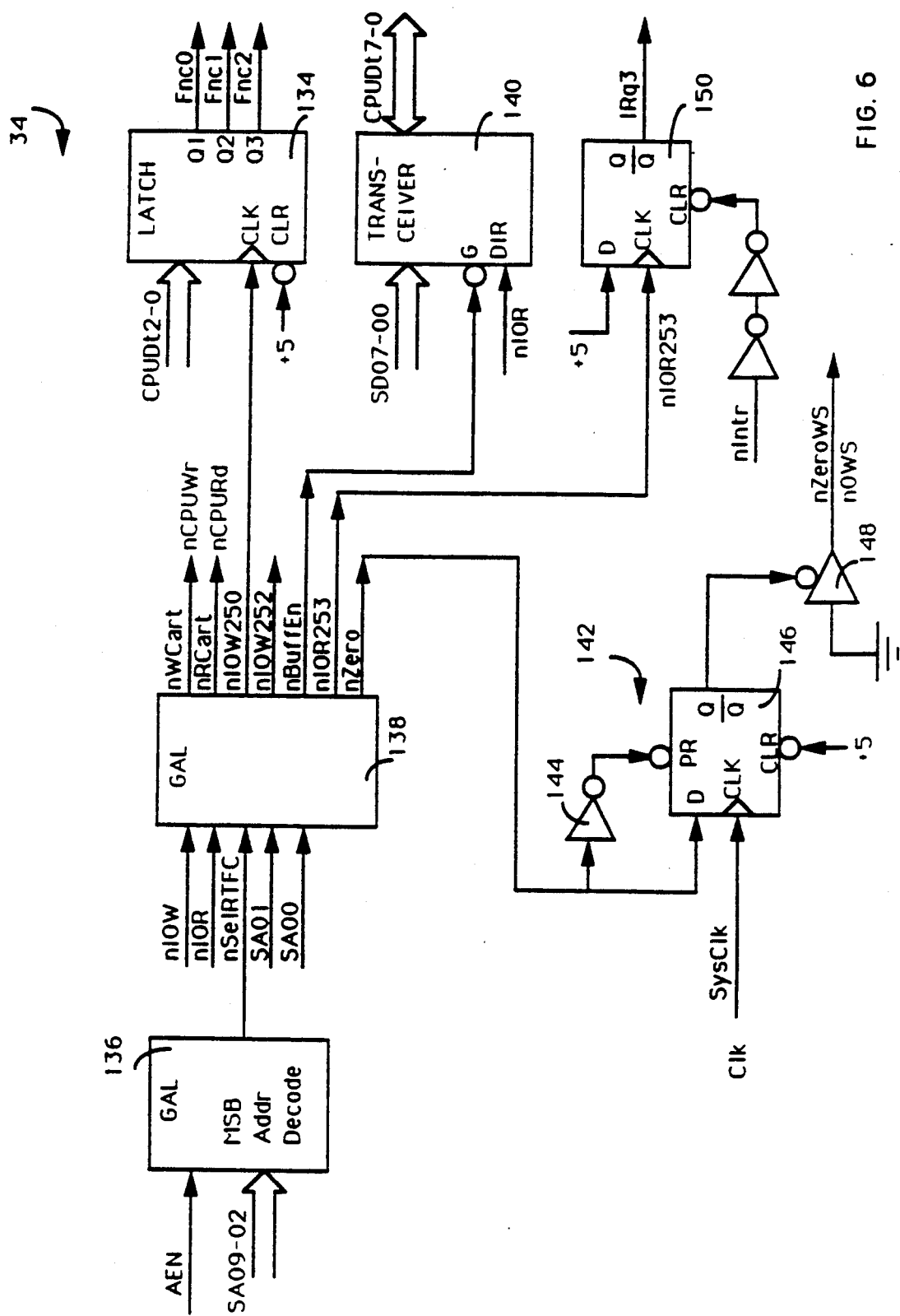
FIG. 6 is a block diagram representation of a graphics interface board used in a host processor shown in FIG. 1.

Referring now to FIG. 6, the graphics interface circuit or port 34 in host data processing system 12 provides a simple, but convenient interface between the AT expansion bus of host processor 12 and the high speed communication path 18. Graphics interface board 34 includes a latch 134, generic array logic 136, 138, a bidirectional transceiver 140, and a zero wait state command circuit 142 having an inverter 144, a flip-flop 146 and a tristate buffer 148. A flip-flop 150 latches interrupt requests from the font cartridge 14 and presents these requests as IRq3 to the host 12. Graphics interface circuit 34 occupies IO addresses HEX 250-253 in the IO address space of host 12.

Generic array logic 136 decodes the most significant bits of the address lines and the CPU address enable signal 136 to generate an active low output signal nSelRTFC when the system addresses SA09-02 select one of the interface addresses with state 10 0101 00 while signal AEN is active low.

Generic array logic 138 receives signal nSelRTFC as an enabling signal and responds by generating additional control signals. Logic 138 further receives the CPU IO read and write signals, nIOR and nIOW as well as the two least significant bit address signals SA01 and SA00.

Signal nCPUWr signals the font cartridge that data is being written by the CPU and goes active low when address signals SA01, SA00 have state 1,0 while nSelRTFC is active low to indicate that port 252 is being addressed while signal IOW is active to indicate a write operation. The read signal nCPURd is identical except that it is enabled by IOR instead of IOW to indicate a port 252 read cycle.

Signal nIOW250 enables writing of the binary coded function codes Fnc2-0 into latch 134 when writing of port 250 is indicated by nSelRTFC being active, SA01, SA00 being 00 and signal IOW being active to indicate an IO write cycle. Signal nIOW250 serves as a clock signal to load any data appearing on the CPU data lines CPUDt2-0 into latch 134 to in turn drive the function selection codes Fnc2-0.

Signal nIOW252 goes active low when IO port 252 is being written but is not used. Signal nBuffEn gates the bidirectional transceiver either when port 250 is written or when port 252 is read or written. The gating of the data signals to the high speed bus when the function latch is written enables the high speed latch to be driven by the data lines of the high speed bus rather than directly by the CPU data lines. As a result the host system data lines need connect only to the transceiver 140 and the loading of the processor system data lines is reduced. The transceiver 140 also drive amplication for communication over high speed bus 18.

Signal nIOR253 goes active low when IO port 253 is read by the host CPU 12 and connects to the clock input of flip-flop 150 so that flip-flop 150 becomes set upon reading IO port 253. The clear input receives signal nIntr from font cartridge 14 and the data input is connected to logic high.

Thus, upon generation of the interrupt request signal nIntr by font cartridge 14, flip-flop 150 is cleared and output nQ goes high to generate the host 12 interrupt request IRq3. This signal is asserted until the interrupt response routine for interrupt 3 is executed. This routine should then read IO port HEX 253 to set flip-flop 150 and terminate the active state of interrupt request signal IRq3.

The physical location of flip-flop 150 can be moved to the real time font cartridge 36. The clock input would be coupled to signal nWrCntlReg. The data input would couple to signal CPUDt3. A preset input would couple to signal nIntr and a clear input would couple to the reset signal from reset circuit 94. Interrupt signal IRq3 would be driven from the Q output and communicated over high speed bus 18 to the host 12 ISA bus. This would allow the flip-flop to be written as bit 3 of the control register.

Signal nZero goes active low when port 252 is read or written, when port 250 is written or when port 253 is read. As the port access occurs the host 12 system clock signal clocks flip-flop 146 to load a zero state therein and cause the Q output to go active low. The active low output enables a tristate buffer 148 which then in turn drives host processor signal nOWS active low. The termination of the selected IO port address causes signal nZero to go active high and preset flip-flop 146 after inversion by inverter 144. Signal nOWS is thus terminated as buffer 148 assumes a high impedance state. Signal nOWS is a host CPU 12 signal that commands a zero wait state bus cycle. This has the effect of speeding up 8 bit bus transfers so that data can be written faster.

In operation desired function codes are written into latch 134 by writing IO port 250. These function codes serve to address selected registers or pseudo registers in font cartridge 36 as explained previously. Once the desired register is selected, it can be read or written by reading or writing port 252. Reading or writing of this port causes transceiver 140 to couple the high speed bus data lines to the host CPU 12 date lines.

As explained previously, reading of port 253 clears the interrupt request IRq3. Port 251 is retained as a space and is not used.

Figure 7:
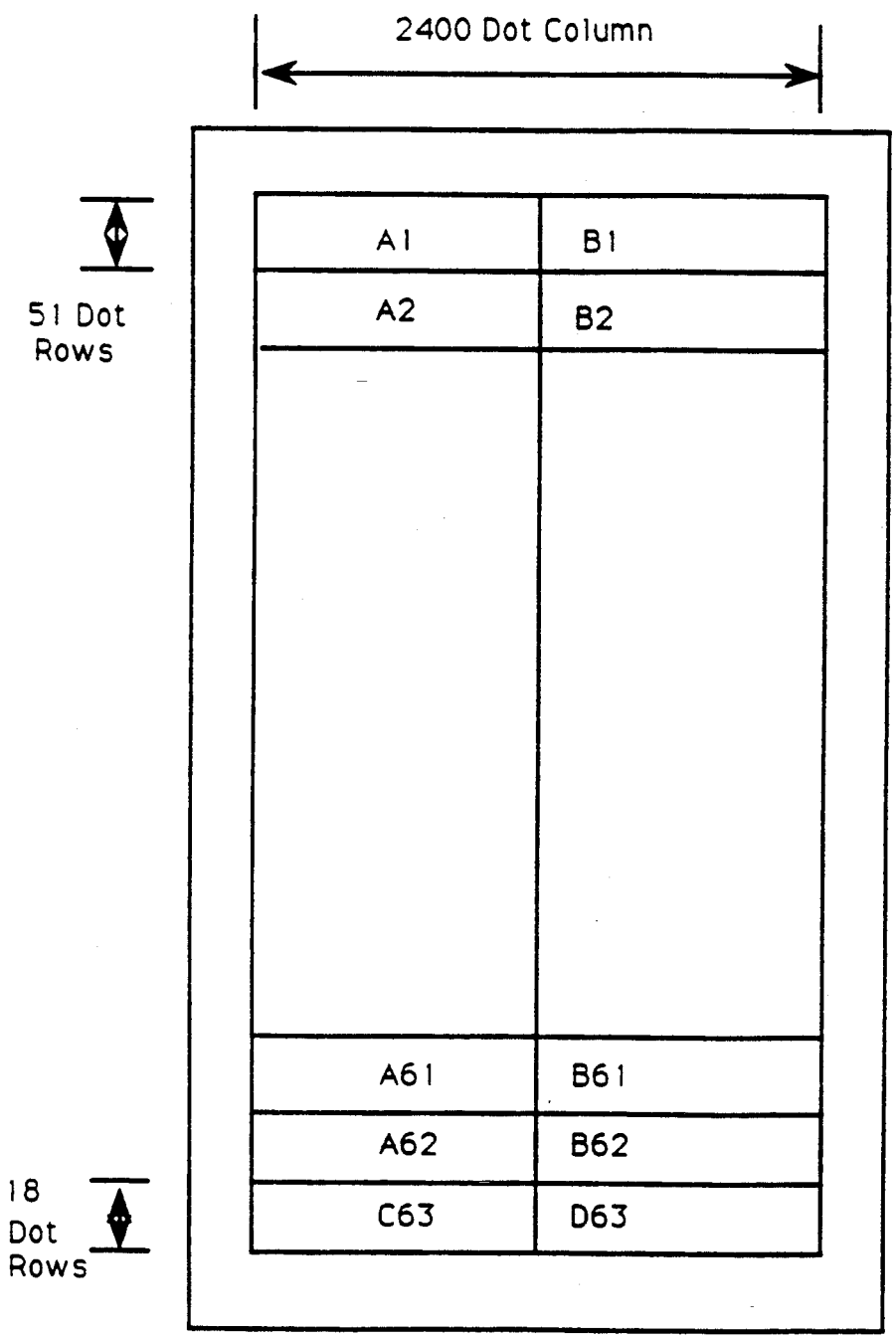
FIG. 7 is a graphic illustration of a manner of communicating graphic image data as a sequence of selectively defined characters.

The manner in which a page of graphic data is broken into sequential sections is illustrated in FIG. 7, to which reference is now made. In accordance with the present invention a graphic image is printed as a sequence of characters with the characters being continuously redefined as the sequence continues along a page of a graphic image. As illustrated for 8 ½ × 11 inch standard letter size print media, standard laser printers print within a window or site that is somewhat smaller than the full size page. The actual print image is 8 inches wide leaving a 1/6 inch border on the left side, a ⅓ inch border on the right side and a top and bottom margin of approximately 0.20 inches are also left. At a print dot resolution of 300 dots per inch, the 8 inch width of the print area results in 2400 dot columns while there are 3180 dot rows between the top and bottom margins.

This site area is divided into an array of character spaces. Because of limitations imposed by standard printer character definitions for font cartridges, a single character is not allowed to be 2400 dot columns wide. The print area is therefore divided into two side by side character columns with character A being 1200 dot columns wide and representing the left hand character column while character B is 1200 dot columns wide and represents the right hand character column.

Similarly, practical size limitations on the image buffers within SRAM 70 limit the number of rows that can be stored at any one time in an image buffer for an image section. For an 8K × 16 image buffer a maximum of 54 dot rows can be stored to define the image patterns for two characters, A and B which are each 1200 dot columns wide. Each dot position is defined by a single bit and each byte contains 8 bits. The A and B characters that are 1200 dot columns wide and 51 dot rows high thus each occupy 7650 bytes of data.

A memory map of the data sent to real time font cartridge 36 to load each 8K buffer is shown in TABLE I below. Bytes 0-64 define a font header for a first font. At power turn on the printer reads the first four bytes and expects to find the ASCII characters "FONT" at this location. Bytes 64-831 provide a character metric table with 8 bytes of data for each character. Only characters A, B, C and D are defined. Dot image data for characters A and C is overlappingly stored in bytes 832-8481. Only one of the two characters is actually defined and used at any one time. Characters B and D are similarly defined at bytes 8482-16131. Bytes 16132-16145 define a dummy header for a second font that is not fully implemented. Bytes 16204-16383 contain an 8 byte terminator sequence.

TABLE I

| DEC ADDR | TYPE | DATA | (COMMENTS) |
|---|---|---|---|
| HEADER | | | |
| 0-13 | LABEL | "FONTABCD_8 × 11" X00 | |
| 14 | fontType | X00 | (7 Bit, 32-127 Printable) |
| 15-21 | unknown | X00,X00,X00, X00,X00,X00, X00 | |
| 22 | orientation | X00 | (Portrait) |
| 23 | unknown | X81 | |
| 24 | typeFace | X06 | (Letter Gothic) |
| 25 | unknown | X00 | |
| 26 | pitchMSB | X00 | |
| 27 | pitchLSB | X19 | |
| 28 | unknownhi | X03 | |
| 29 | unknownlo | X20 | |
| 30 | unknownhi | X02 | |
| 31 | unknownlo | X9A | |
| 32 | pointSizeMSB | X04 | |
| 33 | pointSizeLSB | XC8 | |
| 34 | unknown16hi | X05 | |
| 35 | unknown16lo | XDC | |
| 36 | unknown17hi | X07 | |
| 37 | unknown17lo | X08 | |
| 38 | style | X00 | (Upright) |
| 39 | strokeWeight | XFD | (Light) |
| 40 | deltaX | XFF | |
| 41 | unknown18 | X39 | |

TABLE I-continued

FONT TABLE MEMORY MAP

| DEC ADDR | TYPE | DATA | (COMMENTS) |
|---|---|---|---|
| 42 | unknown19 | X18 | |
| 43 | unknown20 | X06 | |
| 44 | unknown21 | X2C | |
| 45 | unknown22 | X0C | |
| 46 | unknown23 | X00 | |
| 47 | unknown24 | X00 | |
| 48 | fontSizeMSB | X3F | |
| 49 | fontSizeLSB | X04 | |
| 50–63 | unknown | All X00 | |
| CHARACTER METRIC TABLE | | | |
| 64–327 | | All X00 | (First 33 char not defined) |
| 328 | width | X96 | "A" (Dec 150 bytes, 1200 Dot col) |
| 329 | height | X31 | (Dec 51 dot rows) |
| 330 | leftOffset | X00 | |
| 331 | topOffset | X32 | |
| 332 | rowPadding | X00 | |
| 333 | continuation | X00 | |
| 334 | bitMapMSB | X03 | |
| 335 | bitMapLSB | X40 | |
| 336–343 | B | X96,X31,X00, X32,X00,X00, X21,X22 | "B" |
| 344–351 | C | X96,X12,X00, X11,X00,X00, X03,X40 | "C" |
| 352–359 | D | X96,X12,X00, X11,X00,X00, X21,X22 | "D" |
| 360–831 | | All X00 | (Last chars not defined) |
| 832–8481 | | 7650 bytes of dot image data,A 2700 bytes of dot image data,C | |
| 8482–16131 | | 7650 bytes of dot image data,B 2700 bytes of dot image data,D | |
| HEADER (Start Second Font Defintion) | | | |
| 16132–16145 | LABEL | "FONTDUMMY" X00,X00,X00 X00,X00 | |
| 16146–16195 | | 14–63 All X00 except | |
| | orientation | XFF | (Invalid) |
| | fontSizeMSB | X00 | |
| | fontSizeLSB | X40 | |
| 16196–16203 | terminator | X00,X00,X00, X00,X00,X48, X00,X02 | |
| 16204–16383 | | All do not care | |

Each time an image buffer within font store 70 is loaded by host 12, it is loaded with a complete set of font data. The established format for Hewlett Packard LaserJet Series II printers requires the font data to begin with a 64 byte font descriptor or font header as shown in TABLE I. This font descriptor begins at address Hex 10000 in the address space of printer CPU 44. This same address space begins at HEX 0000 in the CPU port address space defined by address counter 72 (FIG. 3).

In the preferred embodiment four characters are used in the font, A, B, C and D. It will be appreciated that since only two characters are used at any one time, definition of only two characters would actually be required. However, the last two characters to be printed have a different height since the number of dot lines on a page is not an integer multiple of 51 and it is helpful from the point of view of the programmer to give these last two characters a different name, i.e. C, D. Since the image definition addresses for characters C and D overlap the image definition addresses for characters A, B respectively, the use of four characters instead of two makes very little difference.

It will be appreciated that any scheme could be used which writes all of the dot pattern data defining a desired image to font store 70 and causes the characters represented thereby to be printed at the proper location. For example, a single large character could be stored in the image buffer, multiple smaller characters could be stored in the image buffer or a character of a different height could be used for each different section of the image to be printed.

However, for ease of programming the present method of using equal sized character pairs until the bottom two sections are printed is preferred. Furthermore, the Hewlett Packard font structure format does not allow a single character to be wide enough to cover an entire page. A single character implementation would therefore require a nonstandard font structure format.

The host CPU 12 operates to control the printing of a graphic image. It is presumed that the image to be printed has first been developed and than transformed to a full page bit map image that is stored in a disk file under a known file specification. Each byte in the bit map image contains 8 consecutive bits which represent 8 consecutive dots respectively in a dot row of the image.

The bit map image must have a resolution that is consistent with the resolution of the printer. For example, a resolution of 300 dots per inch in both the vertical and horizontal direction is typical for laser printers and is presumed herein. The bit map image is required to be an integer number of bytes wide in the disclosed system. The bit map image must be padded with enough blank or "white" dots at the right hand edge to make the number of dots in a dot row an integer multiple of 8. The use of integer bytes is required to define the character fonts for most laser printers and is a convenient expedient that simplifies byte oriented systems. In general, noninteger byte images could of course be accommodated at the expense of an increase in circuit or processing complexity and a loss of compatibility with the standard font cartridge interface.

Once a bit map image has been written to a known location such as a data file within disk system 32 or a high speed RAM disk, the image can be printed by calling the image print routine. As this routine is called it is passed the file specification of the file storing the bit map image, the number of bytes in a dot line and the number of dot lines in the image. In the present implementation the image must be 300 bytes wide (150 bytes per character) and 3180 dot rows or scan lines high. This results in 62 character lines or sections of 51 scan lines each and a final character row 63 with 18 scan lines for characters C and D.

The real time font cartridge 36 connects to high speed data channel 18 through a 25 pin DB25 connector having the pin to signal assignments shown in TABLE II. Similarly, connection to printer 14 or expander cartridge 52 is provided through a double side PCB edge connector with 25 pins on each side as shown in TABLE III.

TABLE II

| HIGH SPEED CHANNEL CONNECTOR | |
|---|---|
| PIN | SIGNAL |
| 1 | CPUDt7 |
| 2 | CPUDt6 |
| 3 | CPUDt5 |
| 4 | CPUDt4 |
| 5 | CPUDt3 |
| 6 | CPUDt2 |
| 7 | CPUDt1 |
| 8 | CPUDt0 |
| 9 | OMICVcc |
| 10 | OMICVcc |
| 11 | Fnc1 |
| 12 | nCPURd |
| 13 | nIntr |
| 14 | OMICGnd |
| 15 | OMICGnd |
| 16 | OMICGnd |
| 17 | OMICGnd |
| 18 | OMICGnd |
| 19 | OMICGnd |
| 20 | OMICGnd |
| 21 | OMICGnd |
| 22 | OMICVcc |
| 23 | Fnc2 |

TABLE II-continued

| HIGH SPEED CHANNEL CONNECTOR | |
|---|---|
| PIN | SIGNAL |
| 24 | Fnc0 |
| 25 | nCPUWr |

TABLE III

| PRINTER CONNECTOR | | |
|---|---|---|
| PIN | COMPONENT SIDE | SOLDER SIDE |
| 1 | 68KAd21 | n68KR/W |
| 2 | n68KSel | n68KUDS |
| 3 | n68KAck | 68KID |
| 4 | n68KLDS | 68KAd1 |
| 5 | 68KAd2 | 68KAd3 |
| 6 | 68KAd4 | 68KAd5 |
| 7 | 68KAd6 | 68KAd7 |
| 8 | 68KAd8 | 68KAd9 |
| 9 | 68KAd10 | 68KAd11 |
| 10 | 68KAd12 | 68KAd13 |
| 11 | 68KAd14 | 68KAd15 |
| 12 | 68KAd16 | 68KAd17 |
| 13 | 68KAd18 | 68KAd19 |
| 14 | 68KAd20 | 68KDta0 |
| 15 | 68KDta1 | 68KDta2 |
| 16 | 68KDta3 | 68KDta4 |
| 17 | 68KDta5 | 68KDta6 |
| 18 | 68KDta7 | 68KDta8 |
| 19 | 68KDta9 | 68KDta10 |
| 20 | 68KDta11 | 68KDta12 |
| 21 | 68KDta13 | 68KDta14 |
| 22 | PRNGnd | 68KDta15 |
| 23 | PRNGnd | 68KOE |
| 24 | PRNVcc | FCSense |
| 25 | PRNVcc | 68KClk |

Figure 8:
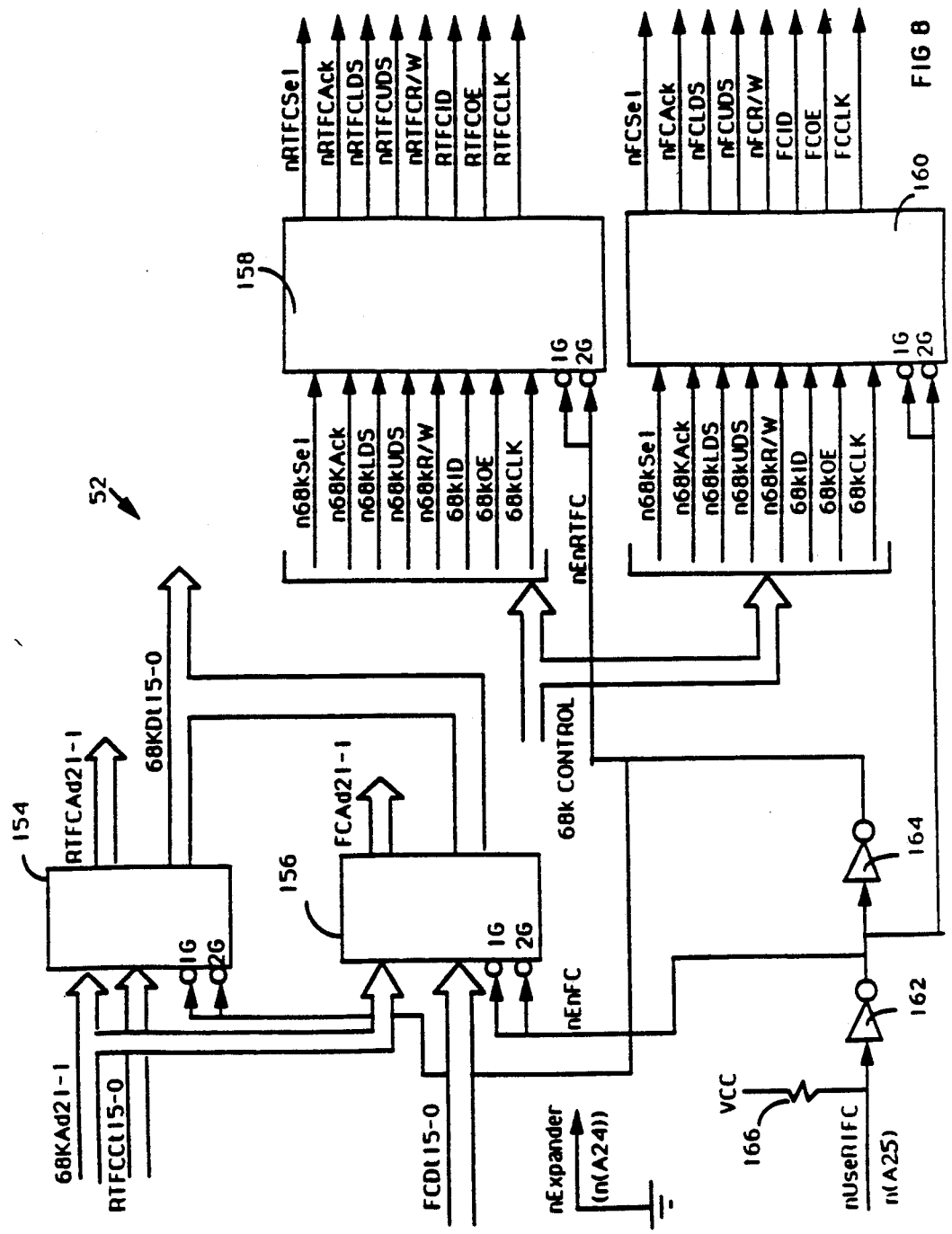
FIG. 8 is a block diagram representation of the expander shown in FIG. 2.

Referring now to FIG. 8, the expander cartridge 52 is essentially a multiplexer that connects either real time font cartridge 36 or conventional font cartridge 55 to printer 14.

Expander cartridge 52 includes two tristate gates 154, 156 for address and data signals, a tristate gate 158 for selectively coupling printer control signals to real time font cartridge 36 and a tristate gate 160 for selectively coupling printer control signals to conventional font cartridge 55.

Two inverters 162, 164 receive a signal nUseRTFC which is the same as signal nUseRTFC or n(A25). Normally these signals are high so that the output of inverter 162 is low to drive signal nEnFC active low. At the same time the output of inverter 164 is high to drive signal nEnRTFC inactive high. When active low signal nEnFC enables gate 156 to pass the printer 14 address signals to the conventional font cartridge 55 and the conventional font cartridge 55 data signals to printer 14. At the same time, gate 160 is enabled to pass bus control signals from printer 14 to font cartridge 55.

Signal nUseRTFC is connected through a pullup resistor 166 to Vcc and is therefore normally in a high state. Only when signal nUseRTFC or n(A25) from driver 100 (FIG. 4) on real time font cartridge 36 is both enabled and driven active low does signal nUseRTFC become active low. Only then does signal nEnRTFC become active low. This signal enables gate 156 to couple printer 14 address signals to the real time font cartridge 36 and to couple data from real time font cartridge 36 to printer 14. At the same time gate 158 is enabled to couple the bus control signals from printer 14 to real time font cartridge 36.

A signal nExpander is driven by ground and couples to enable signal n(A24) for gate 100 (FIG. 4). If the real time font cartridge 36 is not connected at its printer connector a pullup resistor drives signal nExpander or n(A24) high to disable gate 100. Similarly, when plugged into a standard printer connector signal nExpander or n(A24) connects to printer Vcc and gate 100 remains disabled. Only when real time font cartridge 36 plugs into port 53 of expander cartridge 52 can signal n(A24) be driven active low by connection to signal nExpander to enable gate 100.

The pin connectors for RTFC port 53, conventional port 54 and printer port 56 are defined in TABLE IV.

TABLE IV

| | EXPANSION CARTRIDGE CONNECTORS | | | | | |
|---|---|---|---|---|---|---|
| PIN | RTFC COMP SIDE | RTFC SOLD SIDE | FC COMP SIDE | FC SOLD SIDE | PRINT COMP SIDE | PRINT SOLD SIDE |
| 1 | RTFCAd21 | nRTFCR/w | FCAd21 | nFCR/W | 68KAd21 | n68KR/W |
| 2 | nRTFCSel | nRTFCUDS | nFCSel | nFCUDS | n68KSel | n68KUDS |
| 3 | nRTFCAck | RTFCID | nFCAck | FCID | n68KAck | 68KID |
| 4 | nRTFCLDS | RTFCAd1 | nFCLDS | FCAd1 | n68KLDS | 68KAd1 |
| 5 | RTFCAd2 | RTFCAd3 | FCAd2 | FCAd3 | 68KAd2 | 68KAd3 |
| 6 | RTFCAd4 | RTFCAd5 | FCAd4 | FCAd5 | 68KAd4 | 68KAd5 |
| 7 | RTFCAd6 | RTFCAd7 | FCAd6 | FCAd7 | 68KAd6 | 68KAd7 |
| 8 | RTFCAd8 | RTFCAd9 | FCAd8 | FCAd9 | 68KAd8 | 68KAd9 |
| 9 | RTFCAd10 | RTFCAd11 | FCAd10 | FCAd11 | 68KAd10 | 68KAd11 |
| 10 | RTFCAd12 | RTFCAd13 | FCAd12 | FCAd13 | 68KAd12 | 68KAd13 |
| 11 | RTFCAd14 | RTFCAd15 | FCAd14 | FCAd15 | 68KAd14 | 68KAd15 |
| 12 | RTFCAd16 | RTFCAd17 | FCAd16 | FCAd17 | 68KAd16 | 68KAd17 |
| 13 | RTFCAd18 | RTFCAd19 | FCAd18 | FCAd19 | 68KAd18 | 68KAd19 |
| 14 | RTFCAd20 | RTFCDt0 | FCAd20 | FCDt0 | 68KAd20 | 68KDt0 |
| 15 | RTFCDt1 | RTFCDt2 | FCDt1 | FCDt2 | 68KDt1 | 68KDt2 |
| 16 | RTFCDt3 | RTFCDt4 | FCDt3 | FCDt4 | 68KDt3 | 68KDt4 |
| 17 | RTFCDt5 | RTFCDt6 | FCDt5 | FCDt6 | 68KDt5 | 68KDt6 |
| 18 | RTFCDt7 | RTFCDt8 | FCDt7 | FCDt8 | 68KDt7 | 68KDt8 |
| 19 | RTFCDt9 | RTFCDt10 | FCDt9 | FCDt10 | 68KDt9 | 68KDt10 |
| 20 | RTFCDt11 | RTFCDt12 | FCDt11 | FCDt12 | 68KDt11 | 68KDt12 |
| 21 | RTFCDt13 | RTFCDt14 | FCDt13 | FCDt14 | 68KDt13 | 68KDt14 |
| 22 | RTFCGnd | RTFCDt15 | FCGnd | FCDt15 | PRNGnd | 68KDt15 |
| 23 | RTFCGnd | RTFCOE | FCGnd | FCOE | PRNGnd | 68KOE |
| 24 | nExpander | FCSense | FCVcc | FCSense | PRNVcc | FCSense |
| 25 | nUseRTFC | RTFCClk | FCVcc | FCClk | PRNVcc | 68KClk |

Figure 9:
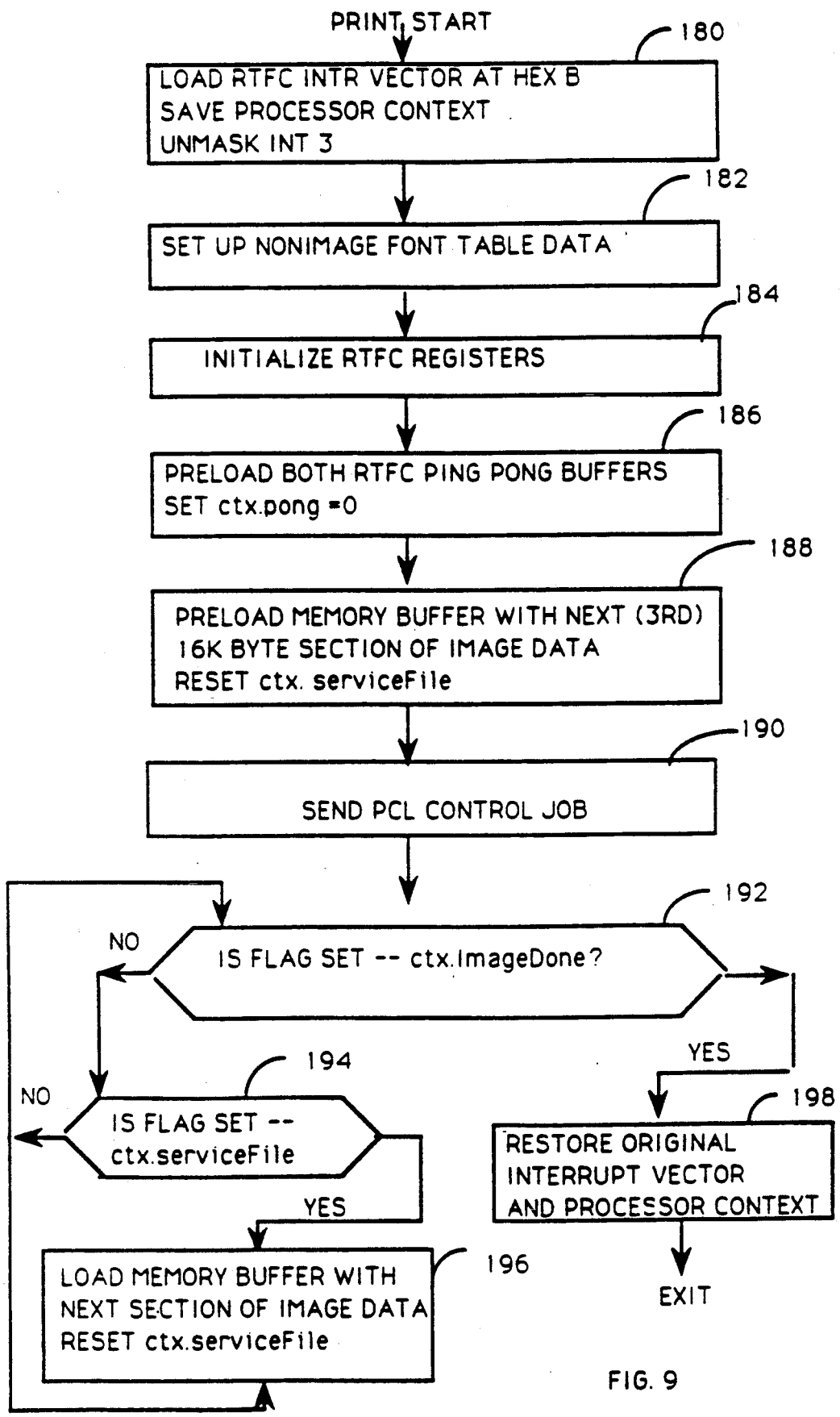
FIG. 9 is a flowchart representation of a print image routine.
Figure 10:
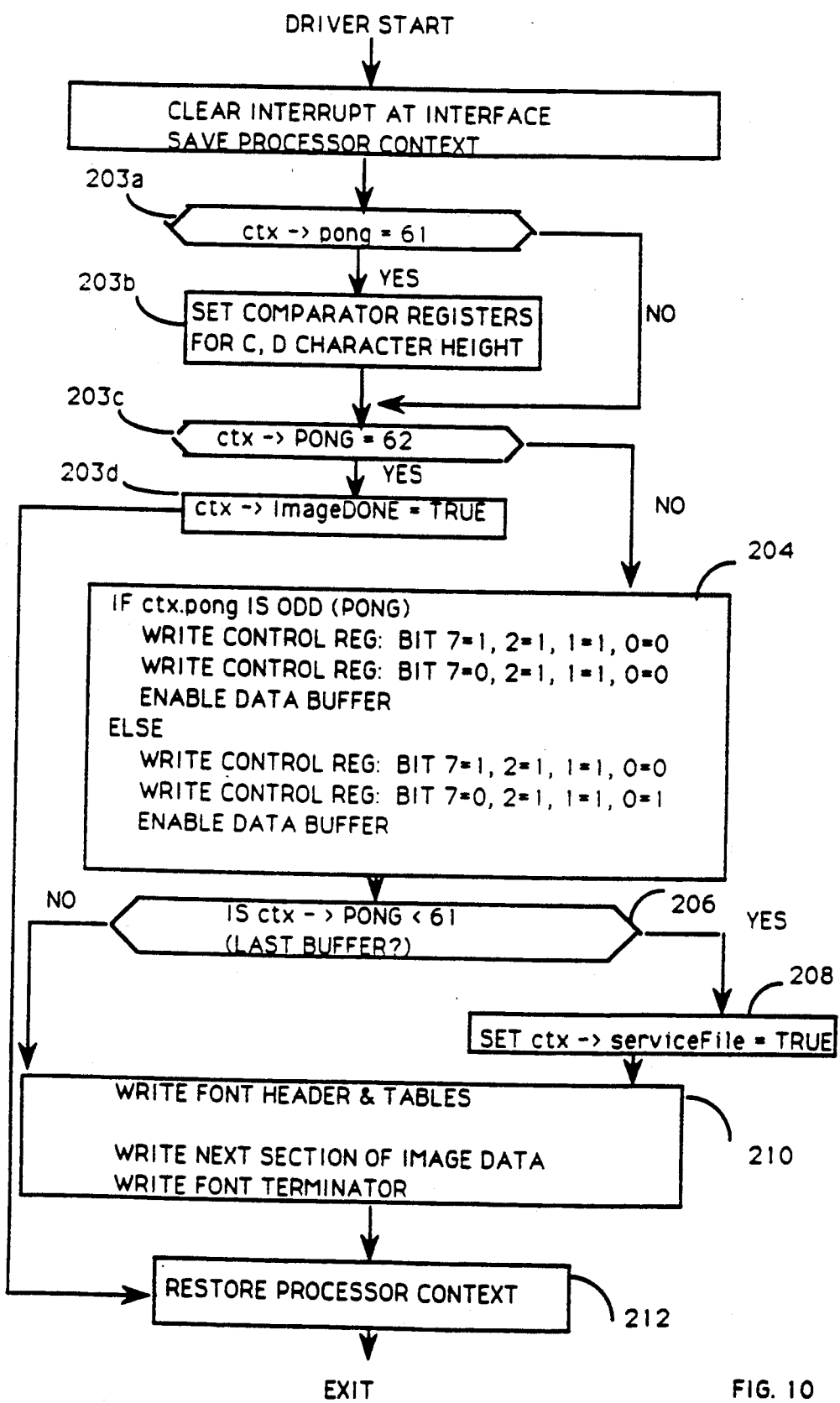
FIG. 10 is a flowchart representation of an interrupt service routine used by a host data processing system shown in FIG. 1.

The program executed by host 12 when printing an image in accordance with the invention is illustrated in FIGS. 9 and 10 to which reference is now made. The main program is illustrated in FIG. 9 with the interrupt response routine or driver being illustrated in FIG. 10. A C Language listing of these programs is set forth in APPENDIX A hereto.

The program begins by loading a real time font cartridge interrupt vector at memory address location HEX B. This address location corresponds to interrupt 3 so that each time processor 38 responds to interrupt request number 3, it obtains the proper vector for responding to the interrupt from this location. The processor context, i.e. the entry register contents, are stored on the stack and interrupt 3 is unmasked. All of this occurs at an initialization step 180. Next, at step 182 the program sets up the nonimage font table data. This data includes the two font headers, the character metric table and the 8 byte termination sequence. This data is defined in TABLE I.

The real time font cartridge is then initialized at step 184. At this step the address counter is reset, the compare circuit is enabled, the ping-pong buffer is set to connect buffer 1 (Ping) to the printer port and any connected expander cartridge 52 is commanded to provide connection to the real time font cartridge connector. This final command will have no effect unless the real time font cartridge is actually connected to a real time font cartridge port 53 of an expander cartridge 52.

At the next step 186, both the ping and pong buffers of double buffer 70 are loaded with the first two sections of font data and then a context variable ctx.pong is set equal to 0 and counts the number of interrupts. The variable ctx.pong is part of a context structure ctx defined in main and made available to all functions which require context information.

Step 188 is then executed to preload a memory buffer within host 12 with the next or third section of image data. The source image data may actually be a disk file and preloading of the third section of the source data into the memory buffer assures that it can be quickly communicated to the double buffer 70 of printer 14 as soon as one of the buffers has been read by printer 14 and an interrupt signal correspondingly sent back to host 12. It is the responsibility of the host 12 to reload a printer 14 buffer in real time as soon as the buffer has been read and before reading of the other buffer by printer 14 is completed. Transferal of the next image section to a memory buffer assures a rapid communication of the next buffer data to real time font cartridge 36 as soon as the next interrupt is received and before the printer generates a succeeding interrupt. A global flag ctx.serviceFile is then reset to indicate that the memory buffer stores the next set of image data.

At step 190 the host 12 then sends the printer control language (PCL) control job or command over the conventional parallel port 16 to printer 14. This command causes printer 14 to actually begin assembling and printing the characters defined by double buffer memory 70 within real time font cartridge 36.

Having sent the PCL control job, the main program now passes into a service loop while it waits for the printer 14 to empty one of the buffer sections and thereby cause real time font cartridge 36 to generate an interrupt request. This interrupt request causes the interrupt service routine illustrated in FIG. 10 to fill the next ping-pong buffer with image data from the preloaded memory buffer which was preloaded at step 188, set the global flag ctx.serviceFile to indicate that memory buffer must be reloaded with the next image section and return.

While the main program illustrated in FIG. 9 is in this service loop, it first operates at step 192 to test a global flag ctx.imageDone to see if a complete image has been communicated to the real time font cartridge 36. Initially this test produces a negative result and the main program then operates at step 194 to test the global flag ctx.serviceFile. Initially this flag will be reset and the program loops back to step 192.

Eventually the printer 14 will complete the reading of the first set of image data to cause the double buffer 70 to be switched and to cause an interrupt request. The interrupt service routine will respond to this interrupt request by filling the now read buffer section with the next image section and setting flag ctx.serviceFile and increments ctx.pong. Upon finding this flag set at step 194, the main program executes a step 196 at which the next section of image data is loaded into the memory buffer, the global flag ctx.serviceFile is reset. The main program then returns to step 192 to continue its loop of waiting and loading the memory buffer with the next section of image data.

Eventually the interrupt service routine of FIG. 10 will communicate a last section of image data to the real time font cartridge 36, buffer 70 and set global flag ctx.imageDone to indicate that the last image section has been communicated to the real time font cartridge 36. Upon detecting a set state for this flag at step 192, the main program executes a step 198 at which the processor 38 restores the original interrupt vector and optionally the original processor data register context before exiting the program.

As illustrated in FIG. 10, the interrupt service routine begins each call by clearing the latched interrupt 3 at graphics interface circuit 34 and saving the processor context.

At step 203a the program tests ctx->pong to see if the last 2 characters are being printed. If so, the address comparators are changed to reflect the different height of the last 2 characters (Step 203b). At step 203c the program tests ctx->pong to see if the value=62, indicating all data printed. If so, step 203d is executed, setting ctx.imageDone=TRUE. The main program will then restore entry state and exit.

Next, at step 204 the interrupt service routine determines whether context variable ctx->pong is even or odd. This variable indicates a count of the image section which is stored in the host memory buffer for communication as the next image section to real time font cartridge 36. If odd, the next image section is to be stored in double buffer pong or 0 and the service routine writes real time font cartridge 36 control register with bit 7=1, bit 2=1, bit 1=1, and bit 0=0 to reset the address counter, enable connection through an expander cartridge 52, to enable compare and to assure connection of the CPU port to buffer 0 or pong. Next the control register is written with bit 7 set to 0 to enable operation of the address register and the function control bits are set to Fnc2-0=011 so that data sent to the output port will be written into the currently receiving section of double buffer 70 and the address counter will be incremented. In the event that pong is found to be even, the same procedure is executed except that bit 0 of the control register is set to 1 to command register 1 or ping to be coupled to the CPU interface.

Upon completion of step 204, the context variable ctx->pong is tested at step 206 to determine if more data needs to be read from the image file. If the context variable is set to a number less than 61, a last buffer is not being communicated and the service routine proceeds to step 208. At step 208 the context variable ctx->serviceFile is set to cause the main program loop to load a next image section into the memory buffer and the routine then proceeds to communicate the next 16K buffer of image data to the real time font cartridge 36 at step 210. At step 210 the service routine writes a complete image buffer to real time font cartridge 36 at high speed beginning with address 0. It writes the font header and tables followed by the two image data character definitions, the dummy font header and finally the 8 byte font terminator sequence. At step 212 the interrupt service routine restores the processor register context before exiting.

In the event that the test at step 206 indicates that there is no more data to be read from the image file, the code proceeds to step 210. The service routine proceeds through steps 210 and 212 to exit.

Experimentation has been shown that under some circumstances a printer 14 will read data from buffer 70 faster than it can be replenished by the host 12. The operation of the printer can be slowed down to enable transfer of a next section of image data before a next interrupt is generated by causing the printer to read and presumably write the left handmost character a plurality of times, for example, 8 to 10. In reality, duplicate data is merely redundantly stored in an internal printer 14 image buffer and only a single occurrence of each character image is actually printed on the print media.

A typical printer command language (PCL) command sequence might be assembled as shown in Table V. <ESC> means the conventional printer escape character Hex 1B.

TABLE V

| PCL COMMANDS | |
|---|---|
| PCL COMMAND | COMMENT |
| <ESC>E | Reset |
| <ESC>&l0E | Set top margin to line 0 |
| <ESC>&l0L | Disable perforation skip |
| <ESC>&l0C | No vertical motion |
| <ESC>(8U | Select Roman-8 symbol set |
| <ESC>(s0P | Fixed spacing, not proportional |
| <ESC>(s0.25H | Pitch -- 4 inch wide characters |
| <ESC>(s12.24V | Char Height 12.24/72 = 0.17 inch |
| <ESC>(s1S | Style -- Italic |
| <ESC>(s-3B | Stroke weight -- Light |
| <ESC>(s6T | Typeface -- Letter Gothic |
| <ESC>&l4c | Set UMI 4/48 inch |
| <ESC>*p0X | Position horizontally at dot 0 |
| <ESC>xp110YA | Position vertically at dot row 110 and print char A1 |
| [Repeat 2 previous commands 8 times] | |
| <ESC>*p1200X | Position horizontally at dot 1200 |
| <ESC>*p110YB | Position vertically at dot row 110 and print char B1 |
| <ESC>*p0X | Position horizontally at dot 0 |
| <ESC>*p161YA | Position vertically at dot row 161 and print char A2 |
| [Repeat 2 previous commands 8 times] | |
| <ESC>*p1200X | Position horizontally at dot 1200 |
| <ESC>*p161YB | Position vertically at dot row 161 and print char B2 |
| <ESC>*p0X | Position horizontally at dot 0 |
| <ESC>*p212YA | Position vertically at dot row 212 and print char A3 |
| [Repeat 2 previous commands 8 times] | |
| <ESC>*p1200X | Position horizontally at dot 1200 |
| <ESC>*p212YB | Position vertically at dot row 212 and print char B3 |
| . | Command pattern repeats, advancing 51 dot rows each time |

TABLE V-continued

| PCL COMMANDS | |
|---|---|
| PCL COMMAND | COMMENT |
| <ESC>*p0X | Position horizontally at dot 0 |
| <ESC>*p3221YA | Position vertically at dot row 3221 and print char A62 |
| [Repeat 2 previous commands 8 times] | |
| <ESC>*p1200X | Position horizontally at dot 1200 |
| <ESC>*p3221YB | Position vertically at dot row 3221 and print char B62 |
| <ESC>*p0X | Position horizontally at dot 0 |
| <ESC>*p3239YC | Position vertically at dot row 3239 and print char C63 |
| [Repeat 2 previous commands 25 times] | |
| <ESC>*p1200X | Position horizontally at dot 1200 |
| <ESC>*p3239YD | Position vertically at dot row 3239 and print char D63 |
| <ESC>E | Reset -- Print page and eject paper |

The PCL command sequence shown in Table V begins with a reset and then specifies a selected character font. The selected font must be one which is not an internal printer font, thus forcing the printer to look to the font cartridge 36 to find the selected font. The font definition data stored in the font cartridge 36 must of course match the selected font.

Following the font selection commands come cursor position commands and character commands to print the first 62 character rows, two characters per row. Two characters must be printed because available printers do not allow a single character to be wide enough to cover a complete row. If the image being printed were sufficiently narrow, a single character per character row might suffice. The first character A, is redundantly printed 9 times at each occurrence. This forces the printer to load the extensive image data to the exact same image buffer locations 9 times to make the print job more complex and assure that the host can supply image data to the real time font cartridge as fast as it is used by the printer 14. This assures compatibility with some printers that assemble dot image data for different characters in different time intervals.

After the last full height A,B 51 row section 62 has been printed, characters C and D are used to print the last text row or section, which must be adjusted to match the remaining dot rows in the image. In general, characters C and D will be shorter than characters A and B. In the present example they are 18 dot rows high. Note that character C is defined by ⅓ as much data as character A. It is redundantly printed 3 times as much as A so the total printer execution time remains roughly the same.

Once the PCL commands are assembled they can be sent to the printer 14 over the conventional parallel printer port communication path 16 at step 112 as shown in FIG. 1. Thereafter the remainder of the print image task is handled by the interrupt service routine. The main print image task merely waits and monitors the imageDone variable in the global context until the interrupt service routine sets this variable to DONE to indicate task completion. Control then returns to the calling application program.

The interrupt service routine controls all communications between host 12 and real time font cartridge 36 after the string of PCL commands has been sent. The printer executes the PCL command sequentially without interruption. The interrupt service routine must therefore proceed in real time to keep the double buffer 70 loaded with proper dot image data to define the next set of images that are to be printed.

At the printer 14 the characters A1 and B1 are assembled for the first text row. The terminal address register stores the address of the last byte of data that defines the dot image for character B. As this byte is accessed by printer 14 the compare signal is generated by compare circuit 74 (FIG. 2). This signal is communicated to control circuit 78 which responds thereto by switching the port assignments of the double buffer 70 sections and generating an interrupt request. The interrupt signal, nIntr, is generated simultaneously with signal COMPARE.

The host CPU 38 receives the interrupt request as interrupt 3 and uses the previously loaded interrupt vector to initiate execution of the interrupt service routine. A copy of a C Language program listing for the main host program and for the interrupt service routine is set forth in APPENDIX A hereto.

While there has been shown and described above a particular arrangement of a high speed image printing system and method of operation for the purpose of enabling a person of ordinary skill in the art to make and use the invention, it should be appreciated that the invention is not limited to the particular disclosed embodiment. Accordingly, any modifications, variations or equivalent arrangements within the scope of the attached claims should be considered to be within the scope of the invention.

APPENDIX A: REAL TIME FONT TRANSFER PROGRAM LISTINGS

```
/*
 * File Name: rtfc.doc
 * Module: rtfc.doc
 * Modified by: KKI
 * Modified on: Date: 7-16-1990 .. Time: 22-53-58
 * Copyright (c) 1990 Elite High Technology, Inc.
 */

// High level pseudo-code algorithm

Print Image begin
```

```
Set Extender to RTFC

Set up global state variables

Set up Font Tables

-- Load data from font files.

Initialize RTFC

-- Swap in Interrupt Service Routine
    -- Preload Ping Pong buffers
    -- Preload data buffer Send the PCL control job to printer imageDone = FALSE -- this loop runs in the foreground
-- to provide file service for the
-- background ISR until the image is done while not imageDone do if serviceFile then fill data buffer from file serviceFile = FALSE fi endloop Reset Extender to Font Cartridge Restore original interrupt vector end -- this interrupt is invoked whenever the RTFC raises a -- hardware interrupt requesting service to a ping pong
 buffer Handle Interrupt begin if ping pong count = 61 then Reset comparator for final font image fi
```

```
    if ping pong count = 62 then imageDone = TRUE fi if current buffer to load is ping then set RTFC registers for ping else set RTFC registers for pong fi increment ping pong count if ping pong count < 61 serviceFile = TRUE fi

Load RTFC buffer

Write Font Header and Table

Download Buffer

Write Font Terminator end

/*
 * File Name: fontdef.h
 * RCS 3-14-90
 * Copyright (c) 1990 Elite High Technology, Inc.
 * HP font cartridge font structure
 */ ifndef FONTDEF_INCLUDED
define FONTDEF_INCLUDED 1 ifndef NEWTYPES_INCLUDED
include "NewTypes.h"
#endif    /* NEWTYPES_INCLUDED */

/* Font Types */
#define BIT_7   0x00
#define BIT_8   0x01
#define PC_8    0x02

/* Orientation */
#define PORTRAIT   0x00
```

```c
#define LANDSCAPE  0x01
#define TERMINATOR 0xFF

/* Typefaces */
#define LINE_PRINTER                  0
#define COURIER                       3
#define HELV                          4
#define TMS_RMN                       5
#define LETTER_GOTHIC                 6
#define PRESTIGE                      8
#define PRESENTATIONS                11
#define OPTIMA                       17
#define GARAMOND                     18
#define COOPER_BLACK                 19
#define CORONET_BOLD                 20
#define BROADWAY                     21
#define BAUER_BODONI_BLACK_CONDENSED 22
#define CENTURY_SCHOOLBOOK           23
#define UNIVERSITY_ROMAN             24

/* Style */
#define UPRIGHT 0x00
#define ITALIC  0x01

/* StrokeWeight */
#define ULTA_THIN  0xF9
#define THIN       0xFB
#define LIGHT      0xFD
#define MEDIUM     0x00
#define BOLD       0x03
#define BLACK      0x05
#define ULTA_BLACK 0x07
typedef struct {
        UBYTE MSB;
        UBYTE LSB;
} BYTES;

typedef struct {
        UINTEGER startAddress;
        UINTEGER size;
} fontEntry;

typedef struct {
        char   header[14];   /* label: FONT */
        UBYTE  fontType;     /* 0 --> 7 bit
                                (32 to 127 decimal
                                are printable) */
                             /* 1 --> 8 bit
                                (32 to 127 and
                                160 to 255 printable)*/
                             /* 2 --> PC-8
                                (All character codes
                                except 0, 7 to 15, and
                                27 are printable) */
        UBYTE  unknown5;
        UBYTE  unknown6;
        UBYTE  unknown7;
        UBYTE  unknown8;
```

```
UBYTE    unknown9;
UBYTE    unknown10;
UBYTE    unknown11;
SBYTE    orientation;       /* 0 --> Portrait */
                            /* 1 --> Landscape */
UBYTE    unknown12;         /* seems to be constant
                               0x81 */
UBYTE    typeFace;          /* 0 --> Line Printer */
                            /* 3 --> Courier */
                           /* 4 --> Helv */
                            /* 5 --> TmsRmn */
                            /* 6 --> Letter Gothic*/
                            /* 8 --> Prestige */
                            /* 11 -->Presentations*/
                            /* 17 --> Optima */
                            /* 18 --> Garanmond */
                            /* 19 --> Cooper Black*/
                            /* 20 --> Cornet Bold */
                            /* 21 --> Broadway */
                            /* 22 --> Bauer Bodoni
                               Black Condensed */
                            /* 23 --> Century
                               Schoolbook */
                            /* 24 --> University
UBYTE    unknown13;            Roman */
UBYTE    pitchMSB;          /* (byte1<<8)+byte0
                               = xx.xx pitch */
UBYTE    pitchLSB;
/* UWORD16 unknown14; */
UBYTE    unknown14hi;
UBYTE    unknown14lo;
/* UWORD16 unknown15; */
UBYTE    unknown15hi;
UBYTE    unknown15lo;
UBYTE    pointSizeMSB;      /* (byte1<<8)+byte0
                               = xx.xx point */
UBYTE    pointSizeLSB;
/* UWORD16 unknown16; */
UBYTE    unknown16hi;
UBYTE    unknown16lo;
/* UWORD16 unknown17; */
UBYTE    unknown17hi;
UBYTE    unknown17lo;
UBYTE    style;             /* 0 --> Upright */
                            /* 1 --> Italic */
SBYTE    strokeWeight;      /* strokeWeight???
                               2's complement byte */
                            /* (thinnest)
                               -7 <= strokeWidth <= 7
                               (thickest) */
                            /* 0 = standard
                               strokeWidth (0x03) */
                            /* 3 = standard bold
                               strokeWidth */
                            /* -3 = standard light
                               strokeWidth (0xFD) */
```

```c
        UBYTE   deltaX;
        UBYTE   unknown18;
        UBYTE   unknown19;
        UBYTE   unknown20;
        UBYTE   unknown21;
        UBYTE   unknown22;
        UBYTE   unknown23;
        UBYTE   unknown24;
        UBYTE   fontSizeMSB;
        UBYTE   fontSizeLSB;
/* union   {
                BYTES   by8bits;
                  UWORD16 by16bits;
             } fontSize; */   /* (byte1<<8)+byte0 */
        char    unknown[14];
} fontDescriptorFormat;

typedef struct {
        UBYTE width;            /* bytes */
        UBYTE height;           /* lines */
        UBYTE leftOffset;
        UBYTE topOffset;        /* Top offset or
                                   delta-X? */
        UBYTE rowPadding;
        UBYTE continuation;     /* ??? */
        UBYTE bitmapMSB;
        UBYTE bitmapLSB;
} charMetric;

typedef struct {
        fontDescriptorFormat fontDescriptor;
        charMetric           charMetricsTable[192];
} font;

typedef struct {
   fontDescriptorFormat fontDescriptor;
        charMetric           charMetricsTable[96];
} font7Bit;
#endif    /* FONTDEF_INCLUDED */

/*
 * File Name: rtfc.h
 * Module: rtfc.h
 * Modified by: KKI
 * Modified on: Date: 6-7-1990 .. Time: 5-18-28
 * Copyright (c) 1990 Elite High Technology, Inc.
 */ ifndef RTFC_INCL
define RTFC_INCL ifndef FONTDEF_INCLUDED
include "fontdef.h"
#endif

// parallel port i/o definitions
#define INIT          0x1
```

```
#define BUSY_BIT        0x80
#define P_VECTOR        0x17

// IO Register definitions
#define IO_FNC          0x250   /* IO Reg Cntl 0x250 */
define IO_DATA         0x252   /* IO Reg Data 0x252 */ define CNTL_REG_WR  0x00   /* FNC[2:0] = 000 */
define CNTL_REG_RD  0x01   /* FNC[2:0] = 001 */
#define DATA_REG_WR  0x02   /* FNC{2:0} = 010 */
#define DATA_REG_RD  0x03   /* FNC[2:0] = 011 */
#define CMPR_MSB_WR  0x04       /* FNC[2:0] = 100 */
#define CMPR_MSB_RD  0x05       /* FNC[2:0] = 101 */
#define CMPR_LSB_WR  0x06       /* FNC[2:0] = 110 */
define CMPR_LSB_RD  0x07       /* FNC[2:0] = 111 */ define RESET_COUNTER_HIGH  0x80
define RESET_COUNTER_LOW   0x00
#define ENABLE_HIGH         0x02
#define ENABLE_LOW          0x00
#define BNK1_HIGH           0x01
#define BNK1_LOW            0x00
#define USE_RTFC_HIGH       0x04
define USE_RTFC_LOW        0x00 define SRAM8K              0x1FFF define RTFC_INT_VEC_ID 0xB
define RTFC_INT_CLEAR  0x253

// constants for extracting information from
// font template
#define RTFC_FONT_TABLE_OFF     0x0
#define RTFC_FONT_TABLE_SIZE    0x340
#define RTFC_FONT_TERM_OFF      0x3F04
#define RTFC_FONT_TERM_SIZE     0x48
#define RTFC_MAX_IMAGE_DATA     0x3BC4
#define RTFC_NORM_SCANS_IN_BUF  51
#define RTFC_TOTAL_IMAGE_SCANS  3180
#define RTFC_BYTES_PER_SCAN     300
#define RTFC_PCL_BUF_SIZE       512
// types // following typedefs allow long pointer manipulation
ifndef SCDEFS_INCL
typedef struct
{
        unsigned short offset, segment;
} ULToSegOff;

typedef union
{
        ULToSegOff segOff;
        void far *ptr;
} PointerToSegOff;
#endif // SCDEFS_INCL
```

```c
// DOS file handles
typedef short RTFC_ImageSource;
typedef short RTFC_PCLSource;
typedef short RTFC_FontTabSource;
typedef unsigned char RTFC_FontTable
  [RTFC_FONT_TABLE_SIZE];
typedef unsigned char RTFC_FontTerminator
  [RTFC_FONT_TERM_SIZE];

typedef struct rtfc_control
{
  RTFC_ImageSource imageH;
  RTFC_PCLSource pclH;
  RTFC_FontTabSource fontTabH;

short leadScanLines, trailScanLines;
  short leadScanBytes, trailScanBytes;
  short scanBytesHalf1, scanBytesHalf2;
  short currScanLines;

short scanLineBytes, scanLines;
  short scanLineBytesHalf;
  short bytesInBuffer;
  short scanLinesInBuffer;
  short imageDone;
  short serviceFile;

// tracks the number of ping pongs..init to 2
  // because of precache short pong;

unsigned long oldIntVect;

// parallel port addresses
  unsigned short ppData,ppStatus,ppControl;

RTFC_FontTable fontTableNormal, fontTableLast;
  RTFC_FontTerminator fontTerm;

unsigned char pclBuffer[RTFC_PCL_BUF_SIZE];
  unsigned char *buffer;

} RTFC_ControlContext, *RTFC_ControlContextRef;

// function headers

// swap in interrupt service vector void RTFC_Setup (RTFC_ControlContextRef ctx);

// set up RTFC interface board
// initialize global control context.

void RTFC_Initialize (RTFC_ControlContextRef ctx);
```

```c
// Control loop for printing an image.
void RTFC_PrintImage (RTFC_ImageSource imageH,
   RTFC_PCLSource pclH,
   RTFC_FontTabSource fontTabH,
   short scanLineBytes,
   short scanLines,
   unsigned short ppData,
   unsigned char *buffer,
   unsigned short *isrStack);

// Interrupt Service Routine for real time service.
// This is activated every time the RTFC generates an
//    interrupt indicating that one of the 8K Ping Pong
//    buffers is available for loading.
// This function has access to the control context.

interrupt far RTFC_ServiceInterrupt ();

#endif

/*
 * File Name: rtfc.c
 * Module: rtfc.c
 * Modified by: KKI
 * Modified on: Date: 7-16-1990 .. Time: 16-27-15
 * Copyright (c) 1990 Elite High Technology, Inc.
 */

// from CodeRunneR runtime library
#include <cr.h>
#include <crp.h>
#include <sio.h>

// from OMIC system defs
#include "scdefs.h"
#include "rtfc.h"

#define STANDALONE

// globals
// When called from the Kernel, these are only visible
// when DS is

// switched back to DGROUP
unsigned short kernelDS;
unsigned short kernelSP;
unsigned short rtfcCtxRef;

void RTFC_ScreenPrintNum
   (short row, short col, short num, short color)
{
   PointerToSegOff p;
   unsigned char far *vMem;
   char numStr[10];
   char *string = numStr;
```

```c
   // compute video address for direct write
   row = row * (80 * 2);
   col = col * 2;
   p.segOff.segment = 0xb800;
   p.segOff.offset = row + col;
   vMem = p.ptr;

// convert num to string
   *i2dec(num,numStr) = 0;

while (*string)
   {
      *vMem++ = *string++;
      *vMem++ = color;
   }
} long GetTick (void)
{
   _asm
   {
      mov   ah,0
      int   1Ah
      mov   ax,dx
      mov   dx,cx
   }
} void DumpBuffer (char *buf, short bytes)
{
   // use rep outsb for maximum bandwidth across
   // the ISA bus
   _asm
   {
      mov si, buf
      mov cx, bytes
      mov dx, IO_DATA
      rep outsb
   }
}

// FILE I/O functions
short RTFC_fopen (char *pathName)
{
   _asm
   {
      mov   ah;3dh
      mov   al,0h
      mov   dx,pathName
      int   21h
   }
} short RTFC_fclose (short handle)
{
   _asm
   {
```

```c
      mov    ah,3eh
      mov    bx,handle
      int    21h
   }
} short RTFC_fread
  (short handle, char *buf, short bytesToRead)
{
   _asm
   {
      mov    ah,3fh
      mov    bx,handle
      mov    cx,bytesToRead
      mov    dx,buf
      int    21h
   }
} unsigned long RTFC_fpos
  (short handle, unsigned long position, short method)
{
   PointerToSegOff p;
   p.ptr = (void *) position;

_asm
   {
      mov    ah,42h
      mov    al,method
      mov    bx,handle
      mov    cx,p.segOff.segment
      mov    dx,p.segOff.offset
      int    21h
   }
} void PRI_InitParallelPort ()
{
   // use BIOS parallel printer port initialization
   _asm
   {
      mov    ah,INIT
      mov    dx,0
      int    P_VECTOR
   }
}

// POLL the BUSY bit and strobe out data void PRI_SendBuffer (RTFC_ControlContextRef ctx,
   unsigned char *buffer, short len)
{
          unsigned short status;
          short i;
```

```c
            for (i=0; i<len; i++)
            {
                /* latch data */
                outp(ctx->ppData, buffer[i]);

/* poll for busy */
                status = inp(ctx->ppStatus);
                while (!(status & BUSY_BIT))
                    status = inp(ctx->ppStatus);

/* strobe the data */
                outp(ctx->ppControl, 0xD);
                outp(ctx->ppControl, 0xC);
            }
}

// this function must be called ONCE before any others
void RTFC_Setup (RTFC_ControlContextRef ctx)
{
    PointerToSegOff p;

// read interrupt clear port on RTFC to insure
    // interrupt line level is LOW
    inp(RTFC_INT_CLEAR);

// load our interrupt service routine into the proper
    // interrupt vector address.

// get current interrupt vector, save in global
    _asm
    {
        mov     ah,35h
        mov     al,RTFC_INT_VEC_ID
        int     21h
        mov     p.segOff.offset,bx
        mov     p.segOff.segment,es
    } ctx->oldIntVect = p.ptr;

// now put in the new one
    p.ptr = RTFC_ServiceInterrupt;
    _asm
    {
        push    ds
        mov     ah,25h
        mov     al,RTFC_INT_VEC_ID
        mov     dx,p.segOff.offset
        mov     ds,p.segOff.segment
        int     21h
        pop     ds
    }
} void RTFC_SetUpFontTables (RTFC_ControlContextRef ctx)
{
```

```c
  // extract font table from template font that is
  // pre-generated.
  RTFC_fread(ctx->fontTabH,
    ctx->fontTableNormal,sizeof(RTFC_FontTable));

// extract font terminator
  RTFC_fpos(ctx->fontTabH,(long)0,RTFC_FONT_TERM_OFF);
  RTFC_fread(ctx->fontTabH,
    ctx->fontTerm,sizeof(RTFC_FontTerminator));

ctx->bytesInBuffer = RTFC_MAX_IMAGE_DATA;
  ctx->scanLinesInBuffer = RTFC_NORM_SCANS_IN_BUF;
#ifdef STANDALONE
  printf("\nRTFC_SetUpFontTables .. done\n");
#endif // STANDALONE
} void RTFC_SendPCLJob (RTFC_ControlContextRef ctx)
{
  short bytesRead;

PRI_InitParallelPort();

while (TRUE)
  {
    bytesRead = RTFC_fread(ctx->pclH,
      ctx->pclBuffer,RTFC_PCL_BUF_SIZE);

if (bytesRead > 0)
      PRI_SendBuffer(ctx,ctx->pclBuffer,bytesRead);

// last buffer, leave the loop
    if (bytesRead < RTFC_PCL_BUF_SIZE)
      break;
  }
} void RTFC_WriteFontHeaderAndTable
  (RTFC_FontTable fontTable)
{
  DumpBuffer(fontTable,sizeof(RTFC_FontTable));
} void RTFC_WriteFontTerminator
  (RTFC_FontTerminator fontTerm)
{
  DumpBuffer(fontTerm,sizeof(RTFC_FontTerminator));
}

// downloads buffer to RTFC interface.  Needs to be
// interlaced at 1/2 scanLineBytes void RTFC_DownloadBuffer (RTFC_ControlContextRef ctx)
{
  short i;
  unsigned char *line;
```

```
   // write out first half of image (vertically split)
   line = ctx->buffer;
   for (i=0; i<ctx->scanLinesInBuffer; i++)
   {
     DumpBuffer(line,ctx->scanLineBytesHalf);
     line += ctx->scanLineBytes;
   }

// write out second half of image (vertically split)
   line = ctx->buffer + ctx->scanLineBytesHalf;
   for (i=0; i<ctx->scanLinesInBuffer; i++)
   {
     DumpBuffer(line,ctx->scanLineBytesHalf);
     line += ctx->scanLineBytes;
   }
}

// this needs to be called at the beginning of
// each image.
void RTFC_Initialize (RTFC_ControlContextRef ctx)
{
   short i;

// now preload the ping pong buffers.
   // RTFC initialization
   outp(IO_FNC,CNTL_REG_WR);
   outp(IO_DATA,RESET_COUNTER_HIGH | ENABLE_LOW |
BNK1_HIGH | USE_RTFC_HIGH); /* Clear counter address */
   outp(IO_DATA,RESET_COUNTER_LOW  | ENABLE_LOW |
BNK1_HIGH | USE_RTFC_HIGH); /* SRAM: PING */
   outp(IO_FNC,DATA_REG_WR);

// set up interrupt vectors
   RTFC_Setup(ctx);

// always need to write font header and table
   // into each ping pong buffer
   RTFC_WriteFontHeaderAndTable(ctx->fontTableNormal);

// now data buffer from image file
   RTFC_fread
     (ctx->imageH,ctx->buffer,RTFC_MAX_IMAGE_DATA);

RTFC_DownloadBuffer(ctx);
   RTFC_WriteFontTerminator(ctx->fontTerm);

// now load the second buffer
   outp(IO_FNC,CNTL_REG_WR);
   outp(IO_DATA,RESET_COUNTER_HIGH | ENABLE_LOW |
BNK1_LOW | USE_RTFC_HIGH); /* Clear counter address */
                            /* BNK1_LOW --> PONG Bank */
   outp(IO_DATA,RESET_COUNTER_LOW  | ENABLE_LOW |
BNK1_LOW | USE_RTFC_HIGH); /* SRAM: PONG */
   outp(IO_FNC,DATA_REG_WR);

RTFC_WriteFontHeaderAndTable(ctx->fontTableNormal);
```

```c
// now data
RTFC_fread
  (ctx->imageH,ctx->buffer,RTFC_MAX_IMAGE_DATA);

RTFC_DownloadBuffer(ctx);

RTFC_WriteFontTerminator(ctx->fontTerm);

// preload again for next one which will be handled
// by ISR
RTFC_fread
  (ctx->imageH,ctx->buffer,RTFC_MAX_IMAGE_DATA);

outp(IO_FNC,CMPR_MSB_WR);
        outp(IO_DATA,0x1F);

outp(IO_FNC,CMPR_LSB_WR);
  outp(IO_DATA,0x81);

outp(IO_FNC,CNTL_REG_WR);
  outp(IO_DATA,RESET_COUNTER_LOW | ENABLE_HIGH |
BNK1_LOW | USE_RTFC_HIGH);
} void RTFC_PrintImage (RTFC_ImageSource imageH,
  RTFC_PCLSource pclH,
  RTFC_FontTabSource fontTabH,
  short scanLineBytes,
  short scanLines,
  unsigned short ppData,
  unsigned char *buffer,
  unsigned short *isrStack)
{
  PointerToSegOff p;
  RTFC_ControlContext ctx;
  RTFC_ControlContextRef ctxRef = &ctx;
  unsigned short currentDS;
  long startTick, stopTick;

// we're being called from the kernel..Current DS,SS
  // are kernels

// we need to save these into the globals in this
  // modules DS so that the ISR can restore them
  // as it activates
  currentDS = GetOldDS();
  _asm
  {
  ;
  ; KKI.. save values into registers so they are
  ; invulnerable to ds swapping
  ;
    mov    ax,currentDS
    mov    bx,isrStack
    mov    cx,ctxRef
    mov    di,ds
```

```
    push    ds                  ; save current ds, get ready
                                ; to swap mov     ds,ax               ; swap ds to DGROUP (ds at
                                ; load time).. ISR will be here
    mov     kernelDS,di
    mov     kernelSP,bx
    mov     rtfcCtxRef,cx
    pop     ds                  ; restore current ds
}

// set source into global context
ctx.imageH = imageH;
ctx.pclH = pclH;
ctx.fontTabH = fontTabH;
ctx.buffer = buffer;
ctx.ppData = ppData;
ctx.ppStatus = ctx.ppData + 1;
ctx.ppControl = ctx.ppData + 2;

ctx.scanLineBytes = scanLineBytes;
ctx.scanLines = scanLines;
ctx.scanLineBytesHalf = scanLineBytes / 2;
ctx.pong = 0;
ctx.serviceFile = FALSE;

// set up fontTableNormal and fontTableLast fields
RTFC_SetUpFontTables(&ctx);

// initialize RTFC interface, preload ping pong
// buffers
RTFC_Initialize(&ctx);

// Kick off the image by emitting to parallel/serial
// port of the printer.
RTFC_SendPCLJob(&ctx);

// service the ISR' file requests
ctx.imageDone = FALSE;

outp(0x21,0xF0);

while (!ctx.imageDone)
{
  if (ctx.serviceFile)
  {
        RTFC_fread
      (ctx.imageH,ctx.buffer,RTFC_MAX_IMAGE_DATA);

// clear flag
    ctx.serviceFile = FALSE;
  }
}

// free RTFC
outp(IO_FNC,CNTL_REG_WR);
outp(IO_DATA,USE_RTFC_LOW); /* Clear counter address*/
```

```c
#ifdef STANDALONE
  printf("DONE... ctx.pong: %5d\n",ctx.pong);
#endif STANDALONE
  RTFC_ScreenPrintNum(0,77,ctx.pong,4);

// restore original interrupt vector
  p.ptr = ctx.oldIntVect;
  _asm
  {
    push  ds
    mov   ah,25h
    mov   al,RTFC_INT_VEC_ID
    mov   dx,p.segOff.offset
    mov   ds,p.segOff.segment
    int   21h
    pop   ds
  }
}

// on entry, assume DS = DGROUP, SS = DS so it's OK to
// call other functions in this module with arguments.
void RTFC_HandleInterrupt (RTFC_ControlContextRef ctx)
{
//   RTFC_ScreenPrintNum(0,77,ctx->pong,4);

// clear interrupt at interface
  inp(RTFC_INT_CLEAR);

// the test of ctx->pong is only valid for 51 dot high
  // chars.

// ok we're done loading data but we need the last
  // interrupt to know when it's OK to quit to avoid
  // any real time problems switching the FONT cartridge
  // Expander back to the Font Cartridge
  if (ctx->pong == 61)
  {
    // change the comparitor, exit
    outp(IO_FNC,CNTL_REG_WR);
    outp(IO_DATA,ENABLE_LOW | USE_RTFC_HIGH); /* Clear
      counter address */
          outp(IO_FNC,CMPR_MSB_WR);
          outp(IO_DATA,0x15);
    outp(IO_FNC,CMPR_LSB_WR);
    outp(IO_DATA,0xD6);
    outp(IO_FNC,CNTL_REG_WR);
    outp(IO_DATA,ENABLE_HIGH | USE_RTFC_HIGH); /* Clear
      counter address */
  }

//   finally we're really DONE.
  if (ctx->pong == 62)
  {
    ctx->imageDone = TRUE;
    goto LeaveThisMess;
  }
```

```c
   if (ctx->pong & 1)
   {
     // Pong
     outp(IO_FNC,CNTL_REG_WR);
     outp(IO_DATA,RESET_COUNTER_HIGH | ENABLE_HIGH |
BNK1_LOW | USE_RTFC_HIGH); /* Clear counter address */ outp(IO_DATA,RESET_COUNTER_LOW  | ENABLE_HIGH |
BNK1_LOW | USE_RTFC_HIGH); /* SRAM: PING */
     outp(IO_FNC,DATA_REG_WR);
   } else
   {
     // Ping
     outp(IO_FNC,CNTL_REG_WR);
     outp(IO_DATA,RESET_COUNTER_HIGH | ENABLE_HIGH |
 BNK1_HIGH | USE_RTFC_HIGH); /* Clear counter address */ outp(IO_DATA,RESET_COUNTER_LOW  | ENABLE_HIGH |
BNK1_HIGH | USE_RTFC_HIGH); /* SRAM: PING */
     outp(IO_FNC,DATA_REG_WR);
   } ctx->pong++;

if (ctx->pong < 61)
   {
      ctx->serviceFile = TRUE;
   }

RTFC_WriteFontHeaderAndTable(ctx->fontTableNormal);
   RTFC_DownloadBuffer(ctx);
   RTFC_WriteFontTerminator(ctx->fontTerm);

LeaveThisMess:
   // make sure interrupt is unmasked
   outp(0x21,0xF0);

}

// hairy bananas, on entry, the DS = DGROUP and SS = ??.

// realign DS = cachedDS, SS = DS, get address of
// RTFC_ControlContext,
// call RTFC_HandleInterrupt with that argument.
// restore on exit.
// when the ISR first activates, this frame's globals
// are visible,
// kernelDS, kernelSP, rtfcCtxRef (kernelDS based).. use
// these to swap contexts and move to a SAFE stack interrupt far RTFC_ServiceInterrupt ()
{
  // reset the PIC
  _asm
   {
```

```asm
    mov  al,20h
    out  20H,al
;
; KKI.. save global values to registers, impervious to
; stack, ds munching.
;
    mov  ax,kernelDS
    mov  bx,kernelSP
    mov  cx,rtfcCtxRef
    mov  dx,ss
;
; swap ds, ss, sp
;
    mov  ds,ax
    mov  ss,ax
    mov  sp,bx
    push dx          ; save entry SS
    push cx          ; RTFC_ControlContextRef arg
    call RTFC_HandleInterrupt
         add    sp,2
    pop  ss
;
; sp not restored since about to exit the ISR and
; that should do
; mov   sp,bp and also restore ds via pop
;
    }
}
```

```c
#ifdef STANDALONE
unsigned char buffer[0x4000];
unsigned short isrStack[1000];

char *gets (char *s)
{
  short keyCode;
  short i = 0;

while (TRUE)
  {
    keyCode = pckey();
    keyCode &= 0xFF;
    if (keyCode == '\r')
    {
      printf("\n");
      s[i] = '\0';
      break;
    }
    else
    {
      dsp_chr(keyCode);
      s[i++] = keyCode;
    }
  }
  return s;
}
```

```c
main ()
{
  short imageH,pclH,fontTabH;
  unsigned short ppData;
  char fName[20];
  short pos;

printf("RTFC PRINT.. \n");

ppData = 0x378;

printf("Enter Image File Name: ");
  pos = 0;
  fName[0] = '\0';
  strcpy(fName,"testrule.img");
  edit_str(fName,19,&pos,pckey);
  printf("\nImage File: %s\n",fName);
//   gets(fName);
  imageH = RTFC_fopen(fName);
  printf("Enter PCL File Name: ");
  strcpy(fName,"page8x11.pcl");
  edit_str(fName,19,&pos,pckey);
  printf("\nPCL File: %s\n",fName);
//   gets(fName);
  pclH = RTFC_fopen(fName);
  printf("Enter ABCD Font File Name: ");
  strcpy(fName,"abcd8x11.bin");
  edit_str(fName,19,&pos,pckey);
  printf("\nABCD File: %s\n",fName);
//   gets(fName);
  fontTabH = RTFC_fopen(fName);

printf("Parallel Port Address: %X\n",ppData);

RTFC_PrintImage
(imageH,pclH,fontTabH,300,3180,ppData,buffer,
 isrStack+999);

RTFC_fclose(imageH);
  RTFC_fclose(pclH);
  RTFC_fclose(fontTabH);
}
endif // STANDALONE /*
 * File Name:   abcd8X11.c
 * RCS 7-5-90
 * Copyright (c) 1990 Elite High Technology, Inc.
 *
 *    Create a font database for an
 *      HP LaserJet font that can be transfered to
 *      a total of 16K Bytes of SRAM.
 *    Four large bitmap characters are created:
 *      Characters: 'A','B','C' & 'D'
 *      Characters 'A' & 'B" are 1200 bits wide x 51
 *        lines in height (150 bytes x 51 lines)
```

```
*       Characters 'C' & 'D' are 1200 bits wide x 18
*          lines in height.
*       This font is declared as a 7 Bit font to save
*          charactermetric table space.
*       The font is followed by a dummy font header
*          required to make a valid font cartridge font
*       The dummy font header is followed by the
*           magical 8 bytes also required to make a
*           valid font cartridge font
*/ include <stdio.h>
include <malloc.h> ifndef NEWTYPES_INCLUDED
include "NewTypes.h"
endif     /* NEWTYPES_INCLUDED */ ifndef FONTDEF_INCLUDED
include "FontDef.h"
endif     /* FONTDEF_INCLUDED */ ifndef ABCD8x11_INCLUDED
include "ABCD8x11.h"
endif     /* ABCD8x11_INCLUDED */ define COL 150
define ROW 51 define ERROR 1

UBYTE charA[COL][ROW];
UBYTE charB[COL][ROW];

UBYTE magic8Bytes[8] = {0x00, 0x00, 0x00, 0x00,
                        0x00, 0x48, 0x00, 0x02};

main (argc, argv)
int   argc;
char *argv[];
{
        FILE      *outStream;
        font7Bit  *font_p;
        font      *fontTerminator_p;
        UINTEGER  nBytes;
        UBYTE     line;
        UBYTE     byte;
        UBYTE     buffer[1];

printf("ABCD8x11 :\n\n");

if (argc > 1)
        {
```

```
        fprintf(stderr, "Usage:  ABCD8x11");
        exit(ERROR);
} if ((outStream = fopen("ABCD8x11.bin","wb"))
    == NULL)
{
    fprintf(stderr, "Aborting:  Cannot open
            output file %s\n\n","ABCD8x11");
    exit(ERROR);
} nBytes = sizeof(font_p->fontDescriptor) +
         sizeof(font_p->charMetricsTable);

/* Request cleared memory for font structure*/ if ((font_p = (font *)callous
    (nBytes,sizeof(char))) == NULL)
{
    printf("Aborting: allocation error for
            font_p\n");
    exit(ERROR);
}

/* Create 4 character font called ABCD font */

ABCD8x11Descriptor(font_p);
EnterAIntoCharMetricsTable(font_p, 'A');
EnterBIntoCharMetricsTable(font_p, 'B');
EnterCIntoCharMetricsTable(font_p, 'C');
EnterDIntoCharMetricsTable(font_p, 'D');

fwrite(font_p,1,nBytes,outStream);

CreateCharABitmap();
CreateCharBBitmap();

/* Don't need to create bitmaps for
   'C' &  'D' */
for (line=0; line<ROW; line++)
    for (byte=0; byte<COL; byte++)
    {
        buffer[0] = charA[byte][line];
      fwrite
        (buffer,1,sizeof(buffer),outStream);
    }
for (line=0; line<ROW; line++)
    for (byte=0; byte<COL; byte++)
    {
        buffer[0] = charB[byte][line];
      fwrite
        (buffer,1,sizeof(buffer),outStream);
    } free(font_p);
```

```c
    /* Request cleared memory for terminating
       font structure */ nBytes =
     sizeof(fontTerminator_p->fontDescriptor);
    if ((fontTerminator_p = (font *)calloc
          (nBytes,sizeof(char))) == NULL)
    {
        printf("Aborting: allocation error for
               fontTerminator_p\n");
        exit(ERROR);
    }

TerminatingFontDescriptor(fontTerminator_p);

fwrite(fontTerminator_p,1,sizeof
    (fontTerminator_p->fontDescriptor),outStream);

free(fontTerminator_p);

fwrite(magic8Bytes,1,sizeof
           (magic8Bytes),outStream);

if (fclose(outStream) != 0)
    {
        fprintf(stderr, "Aborting:  Cannot close
               output file %s\n\n","ABCD8x11");
        exit(ERROR);
    }
    printf
      ("ABCD8x11.bin successfullycreated.\n\n");
}
void ABCD8x11Descriptor(font *font_p)
{
    UBYTE i;

font_p->fontDescriptor.header[0]  = 'F';
    font_p->fontDescriptor.header[1]  = 'O';
    font_p->fontDescriptor.header[2]  = 'N';
    font_p->fontDescriptor.header[3]  = 'T';
    font_p->fontDescriptor.header[4]  = 'A';
    font_p->fontDescriptor.header[5]  = 'B';
    font_p->fontDescriptor.header[6]  = 'C';
    font_p->fontDescriptor.header[7]  = 'D';
    font_p->fontDescriptor.header[8]  = '_';
    font_p->fontDescriptor.header[9]  = '8';
    font_p->fontDescriptor.header[10] = 'x';
    font_p->fontDescriptor.header[11] = '1';
    font_p->fontDescriptor.header[12] = '1';

font_p->fontDescriptor.fontType     = BIT_7;
    font_p->fontDescriptor.orientation=PORTRAIT;
    font_p->fontDescriptor.typeFace=LETTER_GOTHIC;

font_p->fontDescriptor.pitchMSB     = 0x00;
```

```c
        /* 300 / 1200 bits = 0.25 = 0x0019 */
        font_p->fontDescriptor.pitchLSB       = 0x19;
        font_p->fontDescriptor.pointSizeMSB   = 0x04;
        /* 51 rows * 72/300 = 12.24 = 0x04C8 */
        font_p->fontDescriptor.pointSizeLSB   = 0xC8;
        font_p->fontDescriptor.style          = UPRIGHT;

font_p->fontDescriptor.strokeWeight   = LIGHT;
        font_p->fontDescriptor.deltaX         = 0xFF;
        /* 255 bits = 0xFF */
        font_p->fontDescriptor.fontSizeMSB    = 0x3F;
        font_p->fontDescriptor.fontSizeLSB    = 0x04;

font_p->fontDescriptor.unknown12      = 0x81;
        font_p->fontDescriptor.unknown14hi    = 0x03;
        font_p->fontDescriptor.unknown14lo    = 0x20;
        font_p->fontDescriptor.unknown15hi    = 0x02;
        font_p->fontDescriptor.unknown15lo    = 0x9A;
        font_p->fontDescriptor.unknown16hi    = 0x05;
        font_p->fontDescriptor.unknown16lo    = 0xDC;
        font_p->fontDescriptor.unknown17hi    = 0x07;
        font_p->fontDescriptor.unknown17lo    = 0x08;
        font_p->fontDescriptor.unknown18      = 0x39;
        font_p->fontDescriptor.unknown19      = 0x18;
        font_p->fontDescriptor.unknown20      = 0x06;
        font_p->fontDescriptor.unknown21      = 0x2C;
        font_p->fontDescriptor.unknown22      = 0x0C;
} void EnterAIntoCharMetricsTable
  (font *font_p, UBYTE charIndex)
{
        if ((32 <= charIndex) && (charIndex <= 127))
           charIndex = charIndex-32;
        else if ((160 <= charIndex) &&
                 (charIndex <= 255))
           charIndex = charIndex-64;
        else
        {
            printf
              ("Invalid charIndex = %u\n",charIndex);
            exit(ERROR);
        }
        font_p->charMetricsTable[charIndex].width
          = 0x96; /* 150 bytes */
        font_p->charMetricsTable[charIndex].height
          = 0x33; /* 51 lines */
        font_p->charMetricsTable[charIndex].leftOffset
          = 0x00;
        font_p->charMetricsTable[charIndex].topOffset
          = 0x32; /* height - 1 */
        font_p->charMetricsTable[charIndex].rowPadding
          = 0x00;
        font_p->charMetricsTable[charIndex].
          continuation = 0x00;
        font_p->charMetricsTable[charIndex].bitmapMSB
          = 0x03;
```

```c
                font_p->charMetricsTable[charIndex].bitmapLSB
                    = 0x40;
} void EnterBIntoCharMetricsTable
  (font *font_p, UBYTE charIndex)
{
            if ((32 <= charIndex) && (charIndex <= 127))
               charIndex = charIndex-32;
            else if ((160 <= charIndex) &&
                    (charIndex <= 255))
               charIndex = charIndex-64;
            else
            {
                printf
                  ("Invalid charIndex = %u\n",charIndex);
                exit(ERROR);
            }
            font_p->charMetricsTable[charIndex].width
               = 0x96; /* 150 bytes */
            font_p->charMetricsTable[charIndex].height
               = 0x33; /* 51 lines */
            font_p->charMetricsTable[charIndex].leftOffset
               = 0x00;
            font_p->charMetricsTable[charIndex].topOffset
               = 0x32; /* height - 1 */
            font_p->charMetricsTable[charIndex].rowPadding
               = 0x00;
            font_p->charMetricsTable[charIndex]
                .continuation = 0x00;
            font_p->charMetricsTable[charIndex].bitmapMSB
               = 0x21;
            font_p->charMetricsTable[charIndex].bitmapLSB
               = 0x22;
} void EnterCIntoCharMetricsTable
  (font *font_p, UBYTE charIndex)
{
            if ((32 <= charIndex) && (charIndex <= 127))
               charIndex = charIndex-32;
            else if ((160 <= charIndex) &&
                    (charIndex <= 255))
               charIndex = charIndex-64;
            else
            {
                printf
                  ("Invalid charIndex = %u\n",charIndex);
                exit(ERROR);
            }
            font_p->charMetricsTable[charIndex].width
               = 0x96; /* 150 bytes */
            font_p->charMetricsTable[charIndex].height
               = 0x12; /* 18 lines */
            font_p->charMetricsTable[charIndex].leftOffset
               = 0x00;
```

```
            font_p->charMetricsTable[charIndex].topOffset
              = 0x11; /* height - 1 */
            font_p->charMetricsTable[charIndex].rowPadding
              = 0x00;
            font_p->charMetricsTable[charIndex]
              .continuation = 0x00;
            font_p->charMetricsTable[charIndex].bitmapMSB
              = 0x03;
            font_p->charMetricsTable[charIndex].bitmapLSB
              = 0x40;
} void EnterDIntoCharMetricsTable
  (font *font_p, UBYTE charIndex)
{
            if ((32 <= charIndex) && (charIndex <= 127))
               charIndex = charIndex-32;
            else if ((160 <= charIndex) &&
                     (charIndex <= 255))
               charIndex = charIndex-64;
            else
            {
                printf
                   ("Invalid charIndex = %u\n",charIndex);
                exit(ERROR);
            }
            font_p->charMetricsTable[charIndex].width
              = 0x96; /* 150 bytes */
            font_p->charMetricsTable[charIndex].height
              = 0x12; /* 18 lines */
            font_p->charMetricsTable[charIndex].leftOffset
              = 0x00;
            font_p->charMetricsTable[charIndex].topOffset
              = 0x11; /* height - 1 */
            font_p->charMetricsTable[charIndex].rowPadding
              = 0x00;
            font_p->charMetricsTable[charIndex]
              .continuation = 0x00;
            font_p->charMetricsTable[charIndex].bitmapMSB
              = 0x21;
            font_p->charMetricsTable[charIndex].bitmapLSB
              = 0x22;
} void TerminatingFontDescriptor(font *fontTerminator_p)
{
            UBYTE i;

fontTerminator_p->fontDescriptor.header[0]
              = 'F';
            fontTerminator_p->fontDescriptor.header[1]
              = 'O';
            fontTerminator_p->fontDescriptor.header[2]
              = 'N';
            fontTerminator_p->fontDescriptor.header[3]
              = 'T';
```

```
        fontTerminator_p->fontDescriptor.header[4]
            = 'D';
        fontTerminator_p->fontDescriptor.header[5]
            = 'U';
        fontTerminator_p->fontDescriptor.header[6]
            = 'M';
        fontTerminator_p->fontDescriptor.header[7]
            = 'M';
        fontTerminator_p->fontDescriptor.header[8]
            = 'Y';
        fontTerminator_p->fontDescriptor.orientation
            = 0xFF;
        fontTerminator_p->fontDescriptor.fontSizeMSB
            = 0x00;
        fontTerminator_p->fontDescriptor.fontSizeLSB
            = 0x40;
} void CreateCharABitmap()
{
        UBYTE line;
        UBYTE byte;

for (line=0; line<ROW; line+=8)
            for (byte=0; byte<COL; byte++)
                charA[byte][line] = 0xFF;

/* Upper left corner */
    charA[1][ 0]  |= 0x01;
    charA[1][ 1]  |= 0x03;
    charA[1][ 2]  |= 0x07;
    charA[1][ 3]  |= 0x0F;
    charA[1][ 4]  |= 0x1F;
    charA[1][ 5]  |= 0x3F;
    charA[1][ 6]  |= 0x7F;
    charA[1][ 7]  |= 0xFF;

charA[0][ 8]  |= 0x01;
    charA[0][ 9]  |= 0x03;
    charA[0][10]  |= 0x07;
    charA[0][11]  |= 0x0F;
    charA[0][12]  |= 0x1F;
    charA[0][13]  |= 0x3F;
    charA[0][14]  |= 0x7F;
    charA[0][15]  |= 0xFF;

charA[1][ 8]  |= 0xFF;
    charA[1][ 9]  |= 0xFF;
    charA[1][10]  |= 0xFF;
    charA[1][11]  |= 0xFF;
    charA[1][12]  |= 0xFF;
    charA[1][13]  |= 0xFF;
    charA[1][14]  |= 0xFF;
    charA[1][15]  |= 0xFF;

/* Upper right corner */
        charA[COL-2][0]  |= 0x80;
```

```
charA[COL-2][1]   |= 0xC0;
charA[COL-2][2]   |= 0xE0;
charA[COL-2][3]   |= 0xF0;
charA[COL-2][4]   |= 0xF8;
charA[COL-2][5]   |= 0xFC;
charA[COL-2][6]   |= 0xFE;
charA[COL-2][7]   |= 0xFF;

charA[COL-1][ 8]  |= 0x80;
charA[COL-1][ 9]  |= 0xC0;
charA[COL-1][10]  |= 0xE0;
charA[COL-1][11]  |= 0xF0;
charA[COL-1][12]  |= 0xF8;
charA[COL-1][13]  |= 0xFC;
charA[COL-1][14]  |= 0xFE;
charA[COL-1][15]  |= 0xFF;

charA[COL-2][ 8]  |= 0xFF;
charA[COL-2][ 9]  |= 0xFF;
charA[COL-2][10]  |= 0xFF;
charA[COL-2][11]  |= 0xFF;
charA[COL-2][12]  |= 0xFF;
charA[COL-2][13]  |= 0xFF;
charA[COL-2][14]  |= 0xFF;
charA[COL-2][15]  |= 0xFF;

/* Lower left corner */
charA[0][ROW-16]  |= 0xFF;
charA[0][ROW-15]  |= 0X7F;
charA[0][ROW-14]  |= 0x3F;
charA[0][ROW-13]  |= 0x1F;
charA[0][ROW-12]  |= 0x0F;
charA[0][ROW-11]  |= 0x07;
charA[0][ROW-10]  |= 0x03;
charA[0][ROW- 9]  |= 0x01;

charA[1][ROW- 8]  |= 0xFF;
charA[1][ROW- 7]  |= 0x7F;
charA[1][ROW- 6]  |= 0x3F;
charA[1][ROW- 5]  |= 0x1F;
charA[1][ROW- 4]  |= 0x0F;
charA[1][ROW- 3]  |= 0x07;
charA[1][ROW- 2]  |= 0x03;
charA[1][ROW- 1]  |= 0x01;

charA[1][ROW-16]  |= 0xFF;
charA[1][ROW-15]  |= 0xFF;
charA[1][ROW-14]  |= 0xFF;
charA[1][ROW-13]  |= 0xFF;
charA[1][ROW-12]  |= 0xFF;
charA[1][ROW-11]  |= 0xFF;
charA[1][ROW-10]  |= 0xFF;
charA[1][ROW- 9]  |= 0xFF;
charA[1][ROW- 8]  |= 0xFF;

/* lower right corner */
charA[COL-1][ROW-16] |= 0xFF;
```

```
            charA[COL-1][ROW-15]  |= 0xFE;
            charA[COL-1][ROW-14]  |= 0xFC;
            charA[COL-1][ROW-13]  |= 0xF8;
            charA[COL-1][ROW-12]  |= 0xF0;
            charA[COL-1][ROW-11]  |= 0xE0;
            charA[COL-1][ROW-10]  |= 0xC0;
            charA[COL-1][ROW- 9]  |= 0x80;
            charA[COL-2][ROW- 8]  |= 0xFF;
            charA[COL-2][ROW- 7]  |= 0xFE;
            charA[COL-2][ROW- 6]  |= 0xFC;
            charA[COL-2][ROW- 5]  |= 0xF8;
            charA[COL-2][ROW- 4]  |= 0xF0;
            charA[COL-2][ROW- 3]  |= 0xE0;
            charA[COL-2][ROW- 2]  |= 0xC0;
            charA[COL-2][ROW- 1]  |= 0x80;

charA[COL-2][ROW-16]  |= 0xFF;
            charA[COL-2][ROW-15]  |= 0xFF;
            charA[COL-2][ROW-14]  |= 0xFF;
            charA[COL-2][ROW-13]  |= 0xFF;
            charA[COL-2][ROW-12]  |= 0xFF;
            charA[COL-2][ROW-11]  |= 0xFF;
            charA[COL-2][ROW-10]  |= 0xFF;
            charA[COL-2][ROW- 9]  |= 0xFF;
} void CreateCharBBitmap()
{
            UBYTE line;
            UBYTE byte;

for (line=0; line<ROW; line++)
                for (byte=0; byte<COL; byte++)
                    charB[byte][line] = 0x80;

/* Upper left corner */
    charB[1][ 0]  |= 0x01;
    charB[1][ 1]  |= 0x03;
    charB[1][ 2]  |= 0x07;
    charB[1][ 3]  |= 0x0F;
    charB[1][ 4]  |= 0x1F;
    charB[1][ 5]  |= 0x3F;
    charB[1][ 6]  |= 0x7F;
    charB[1][ 7]  |= 0xFF;

charB[0][ 8]  |= 0x01;
    charB[0][ 9]  |= 0x03;
    charB[0][10]  |= 0x07;
    charB[0][11]  |= 0x0F;
    charB[0][12]  |= 0x1F;
    charB[0][13]  |= 0x3F;
    charB[0][14]  |= 0x7F;
    charB[0][15]  |= 0xFF;

charB[1][ 8]  |= 0xFF;
    charB[1][ 9]  |= 0xFF;
```

```
charB[1][10]    |= 0xFF;
charB[1][11]    |= 0xFF;
charB[1][12]    |= 0xFF;
charB[1][13]    |= 0xFF;
charB[1][14]    |= 0xFF;
charB[1][15]    |= 0xFF;

/* Upper right corner */
        charB[COL-2][0]  |= 0x80;
        charB[COL-2][1]  |= 0xC0;
        charB[COL-2][2]  |= 0xE0;
        charB[COL-2][3]  |= 0xF0;
        charB[COL-2][4]  |= 0xF8;
        charB[COL-2][5]  |= 0xFC;
        charB[COL-2][6]  |= 0xFE;
        charB[COL-2][7]  |= 0xFF;

charB[COL-1][ 8]  |= 0x80;
        charB[COL-1][ 9]  |= 0xC0;
        charB[COL-1][10]  |= 0xE0;
        charB[COL-1][11]  |= 0xF0;
        charB[COL-1][12]  |= 0xF8;
        charB[COL-1][13]  |= 0xFC;
        charB[COL-1][14]  |= 0xFE;
        charB[COL-1][15]  |= 0xFF;

charB[COL-2][ 8]  |= 0xFF;
        charB[COL-2][ 9]  |= 0xFF;
        charB[COL-2][10]  |= 0xFF;
        charB[COL-2][11]  |= 0xFF;
        charB[COL-2][12]  |= 0xFF;
        charB[COL-2][13]  |= 0xFF;
        charB[COL-2][14]  |= 0xFF;
        charB[COL-2][15]  |= 0xFF;

/* Lower left corner */
        charB[0][ROW-16]  |= 0xFF;
        charB[0][ROW-15]  |= 0X7F;
        charB[0][ROW-14]  |= 0x3F;
        charB[0][ROW-13]  |= 0x1F;
        charB[0][ROW-12]  |= 0x0F;
        charB[0][ROW-11]  |= 0x07;
        charB[0][ROW-10]  |= 0x03;
        charB[0][ROW- 9]  |= 0x01;

charB[1][ROW- 8]  |= 0xFF;
        charB[1][ROW- 7]  |= 0x7F;
        charB[1][ROW- 6]  |= 0x3F;
        charB[1][ROW- 5]  |= 0x1F;
        charB[1][ROW- 4]  |= 0x0F;
        charB[1][ROW- 3]  |= 0x07;
        charB[1][ROW- 2]  |= 0x03;
        charB[1][ROW- 1]  |= 0x01;
        charB[1][ROW-16]  |= 0xFF;
        charB[1][ROW-15]  |= 0xFF;
        charB[1][ROW-14]  |= 0xFF;
```

```
        charB[1][ROW-13]    |= 0xFF;
        charB[1][ROW-12]    |= 0xFF;
        charB[1][ROW-11]    |= 0xFF;
        charB[1][ROW-10]    |= 0xFF;
        charB[1][ROW- 9]    |= 0xFF;
        charB[1][ROW- 8]    |= 0xFF;

/* lower right corner */
        charB[COL-1][ROW-16] |= 0xFF;
        charB[COL-1][ROW-15] |= 0xFE;
        charB[COL-1][ROW-14] |= 0xFC;
        charB[COL-1][ROW-13] |= 0xF8;
        charB[COL-1][ROW-12] |= 0xF0;
        charB[COL-1][ROW-11] |= 0xE0;
        charB[COL-1][ROW-10] |= 0xC0;
        charB[COL-1][ROW- 9] |= 0x80;

charB[COL-2][ROW- 8] |= 0xFF;
        charB[COL-2][ROW- 7] |= 0xFE;
        charB[COL-2][ROW- 6] |= 0xFC;
        charB[COL-2][ROW- 5] |= 0xF8;
        charB[COL-2][ROW- 4] |= 0xF0;
        charB[COL-2][ROW- 3] |= 0xE0;
        charB[COL-2][ROW- 2] |= 0xC0;
        charB[COL-2][ROW- 1] |= 0x80;

charB[COL-2][ROW-16] |= 0xFF;
        charB[COL-2][ROW-15] |= 0xFF;
        charB[COL-2][ROW-14] |= 0xFF;
        charB[COL-2][ROW-13] |= 0xFF;
        charB[COL-2][ROW-12] |= 0xFF;
        charB[COL-2][ROW-11] |= 0xFF;
        charB[COL-2][ROW-10] |= 0xFF;
        charB[COL-2][ROW- 9] |= 0xFF;

}

/*
 * File Name: page8X11.c
 * RCS 7-5-90
 * Copyright (c) 1990 Elite High Technology, Inc.
 *
 *      Use the font Gothic 12.24pt 0.25pitch found in
 *        the font cartridge.
 *      This Gothic font was created by the ABFont.c
 *        program.
 *      The font contains 4 character bitmaps: char "A",
 *        "B", "C", "D".
 *      Image the char "A" at x=0 (9 TIMES), and finally
 *        a "B" at x=1200.
 *      The "A" character contains horizontal lines and
 *        is 4 inches by 51 rows.  At the 4 corners of
 *        the bitmap are inverted right triangles that
 *        are 16 bits on a side.  The character "B" is
 *        the same as "A except "B" contains vertical
 *        lines instead of horizontal lines.
```

```
*       Characters "C" & "D" are 18 lines tall and
*          4 inches wide.
*/ include <stdio.h>
include <stdlib.h>
include <string.h> define HEIGHT_A     51 /* 51 pixels tall */
define HEIGHT_C     18 /* 18 pixels tall */ define TOP_PADDING  59 /* Unprintable area at top of
                              page (defined in PCL manual) */
                         /* Gives 60 lines of padding */
#define NUM_BANDS    62 /* Number bands on 8x11 sheet */
main()
{
        FILE *outStream;
        char *dataBuffer;
        int  y;
        int  length;
        int  i;
        int  j;
        char buffer[10];
        char *str_p;
        int  lastbandY;

printf("Full Page --> Gothic Light 24.24pt
        0.25pitch : \n\n");

if ((outStream = fopen("Page8x11.pcl", "wb"))
     == NULL)
    {
       fprintf(stderr, "Aborting: Cannot open output file
             'Page8x11.PCL'\n\n");
       exit(1);
    }

/* Printer Reset command: */
        /*    flush any buffer data */
        /*    init printer environment */
        fwrite("^[E",2,1,outStream);

/* Change perferation */
        fwrite("^[&10E^[&10L",10,1,outStream);

/* Change default font to the font
          cartridges': */
        /*    Orientation    Portrait  ^[&10C */
        /*    Symbol Set     8U        ^[(8U  */
        /*    Spacing        Fixed     ^[(s0P */
        /*    Pitch          0.25 cpi  ^[(s0.25H */
        /*    Height         12.24pt   ^[(s12.24V */
        /*    Style          Italic    ^[(s1S */
        /*    Stroke Weight  Light     ^[(s-3B */
        /*    Typeface       Courier   ^[(s6T */
```

```
            fwrite("^[&10C",     5,1,outStream);
            fwrite("^[(8U" ,     4,1,outStream);
            fwrite("^[(s0P",     5,1,outStream);
            fwrite("^[(s0.25H",  8,1,outStream);
            fwrite("^[(s12.24V",9,1,outStream);
            fwrite("^[(s1S",     5,1,outStream);
            fwrite("^[(s-3B",    6,1,outStream);
            fwrite("^[(s6T",     5,1,outStream);

/* Must set VMI for LF to work after selecting
               a new font? */
            /* VMI = ^[&1#C  (# = number of 1/48th inch
               increments between rows */
            fwrite("^[&14C",5,1,outStream);
j=1;
for (y=TOP_PADDING+HEIGHT_A; y<=TOP_PADDING+
    (HEIGHT_A*NUM_BANDS); y+=HEIGHT_A)
{
        printf("Band %i = 'A','B' at
                y=%i\n",j++,y);
        str_p=itoa(y,buffer,10);
        length = strlen(str_p);

for (i=1; i<=9; i++)
        {
                fwrite("^[*p0X",   1,5,outStream);
                fwrite("^[*p",     1,3,outStream);
                fwrite(str_p,      1,length,outStream);

fwrite("Y",        1,1,outStream);
                fwrite("A",        1,1,outStream);
        } fwrite("^[*p1200X",1,8,outStream);
        fwrite("^[*p",     1,3,outStream);
        fwrite(str_p,      1,length,outStream);
        fwrite("Y",        1,1,outStream);
        fwrite("B",        1,1,outStream);

lastbandY = y;
}
        printf("Band %i = 'C','D' at
                y=%i\n",j++,lastbandY+HEIGHT_C);
        str_p=itoa(lastbandY+HEIGHT_C,buffer,10);
        length = strlen(str_p);

for (i=0; i<26; i++)
{
        fwrite("^[*p0X",   1,5,outStream);
        fwrite("^[*p",     1,3,outStream);
        fwrite(str_p,      1,length,outStream);
        fwrite("Y",        1,1,outStream);
        fwrite("C",        1,1,outStream);
}
```

```
fwrite("^[*p1200X",1,8,outStream);
fwrite("^[*p",    1,3,outStream);
fwrite(str_p,     1,length,outStream);
fwrite("Y",       1,1,outStream);
fwrite("D",       1,1,outStream);

/* Printer Reset command: */
/*   print current page */
fwrite("^[E",2,1,outStream);

if (fclose(outStream) != 0)
    {
       fprintf(stderr, "Aborting:  Cannot close output
            file 'Page8x11.PCL'\n\n");
       exit(1);
    }
    printf
      ("Page8x11.PCL has been successfully created!\n\n");

}
```

What is claimed is:

1. A printing system comprising:
a writable font store that is connectable to receive from a host data processing system and store character definition data defining an image of at least one character to be printed, the character definition data being communicated over a first communication path; and
a printer subsystem connectable to receive from a host data processing system over a second communication path different from the first communication path a command to print the at least one character, the printer subsystem being operable in response to a received print command to print the at least one character by accessing the character definition data stored in the font store and printing the at least one character with an image defined by the stored character definition data.

2. A printing system according to claim 1 wherein the printer subsystem is a dot image printer.

3. A printing system according to claim 1 wherein the printer subsystem is a dot image printer having a resolution of at least 300 dots per inch in both horizontal and vertical directions.

4. A printing system according to claim 1 wherein the printer subsystem is a laser printer.

5. A printing system according to claim 1 further comprising a pluggable font cartridge having said writable font store and wherein the printer subsystem includes a plug connector pluggably receiving the font cartridge.

6. A printing system comprising:
means for storing data defining a printable image for at least one selected character;
a first data path coupled to communicate to the storing means data defining the printable image;
means for printing characters including the at least one selected character in response to received print commands;
a second data path coupled to communicate print commands to the printing means; and
a host data processing system coupled to the first data path to write into said storing means via the first data path data defining a printable image for said at least one selected character, said data defining a section of a desired printable image, the host data processing system being coupled to the second data path to command via the second data path the printing means to print a sequence of the selected characters having the printable image thereof defined by the storing means, the sequence being selected in conjunction with the data defining a printable image written into the data storing means so as to cause the printer to print said printable image as a plurality of sections, each section corresponding to a selected character.

7. A method of printing a graphic image using a printer having a writable data store storing information defining an image of a character to be printed, the method comprising the steps of:
writing into the data store via a first data path information defining at least a portion of an image that is to be printed, the information being written to a data store location corresponding to a selected character; and
commanding the printer to print the selected character via a second data path different from the first data path.

8. A method of printing a graphic image using a printer having a writable data store via a first data path storing information defining an image of at least one character to be printed, the method comprising the steps of:
writing into the data store information defining a portion of a graphic image that is to be printed, the information being written into the data store at locations corresponding to a selected character;
commanding the printer to print the selected character at a position on a print medium corresponding to a position of the graphic image portion within the graphic image, the command being communicated over a second data path different from the first data path; and
repeating the above two steps with information defining a different portion of the graphic image being written to the data store each time until the complete image has been printed.

9. A method of printing a graphic image using a printer having a plug connector for pluggably receiving a font cartridge that includes a data store storing information defining an image of at least one printable character, the method comprising the steps of:

plugging into the connector a cartridge having a writable data store for storing information defining an image of at least one character that can be printed by the printer, the cartridge being operatively connected to provide communication between the data store and a host data processing system, the printer further being connected to the host data processing system and being operable to print at least one character having an image defined by information stored in the data store;

writing into the data store from the host data processing system via a first data path information defining at least a portion of the graphic image, said graphic image defining information being written into locations in the data store corresponding to a selected character; and commanding the printer from the host data processing system via a second data path different from the first data path to print the selected character.

10. A method of printing according to claim 9 further comprising the step of repeating said writing and commanding steps until a complete image has been printed as a mosaic of individual image sections wherein each image section corresponds to a single selected character image pattern.

* * * * *